US006741242B1

(12) United States Patent
Itoh et al.

(10) Patent No.: US 6,741,242 B1
(45) Date of Patent: May 25, 2004

(54) MULTIMEDIA DOCUMENTS INTEGRATING AND DISPLAYING SYSTEM

(75) Inventors: Hiroyuki Itoh, Urayasu (JP); Takashi Yoshida, Kodaira (JP)

(73) Assignee: Famotik Kabushikikaisha, Tokyo (JP)

( * ) Notice: Subject to any disclaimer, the term of this patent is extended or adjusted under 35 U.S.C. 154(b) by 700 days.

(21) Appl. No.: 09/617,885

(22) Filed: Jul. 17, 2000

(30) Foreign Application Priority Data

Mar. 23, 2000 (JP) ....................................... 2000-082623

(51) Int. Cl.[7] ................................................ G06T 15/00

(52) U.S. Cl. ....................................................... 345/419

(58) Field of Search ................................ 345/419, 420, 345/421, 422, 423, 424, 426, 427, 428, 581, 606, 744, 760

(56) References Cited

FOREIGN PATENT DOCUMENTS

| | | |
|---|---|---|
| JP | 09-259157 | 10/1997 |
| JP | 10-033147 | 2/1998 |
| JP | 10-097558 | 4/1998 |
| JP | 10-154242 | 6/1998 |
| JP | 11-027285 | 1/1999 |
| JP | 11-161817 | 6/1999 |
| JP | 11-175577 | 7/1999 |
| JP | 11-191095 | 7/1999 |

OTHER PUBLICATIONS

XML W3C Working Draft Nov. 14, 1996.*

SVG 1.0 Specification W3C Working Draft Mar. 3, 2000 Sections 3, 4, and 7.*

TV Broadcast URI Schemes Requirements Oct. 21, 1999.*

* cited by examiner

*Primary Examiner*—Almis R. Jankus

(74) *Attorney, Agent, or Firm*—Knoble Yoshida &Dunleavy

(57) ABSTRACT

A multimedia documents integrating and displaying system, comprising, a framework function section for operating in close communication with a parser, interpreting various drawing tags in a document described in a markup language, generating a framework for synchronizing and operating various drawing primitives, and generating a two-dimensional drawing command and a three-dimensional drawing command based on the framework, a two-dimensional rendering function section for receiving the two-dimensional drawing command from the framework function section, and creating a two-dimensional canvas capable of executing the two-dimensional drawing command on a Web browser, and a three-dimensional rendering function section for receiving the three-dimensional drawing command from the framework function section, and creating a three-dimensional canvas capable of executing the three-dimensional drawing command on the Web browser.

60 Claims, 24 Drawing Sheets

| | |
|---|---|
| RESERVED WORDS | WORDS STIPULATED FOR AN XML FORMAT. FOR EXAMPLE, 'SHAPE' AND 'GEOMETRY'. |
| INTEGERS | WORDS INDICATING INTEGER VALUES. FOR EXAMPLE, '0', '58', '-40', AND '+77'. |
| REAL NUMBERS | WORDS INDICATING REAL NUMBER VALUES. FOR EXAMPLE, '1.0', '5.8f', '.789' AND '-11.22'. |
| DELIMITERS | SYMBOLS SEPARATING OR GROUPING WORDS. FOR EXAMPLE, ',', '"', '{', AND '}'. |
| CHARACTER STRINGS | WORDS WITH NO ATTRIBUTES. |

| RESERVED WORDS | WORDS STIPULATED FOR AN XRML FORMAT. FOR EXAMPLE, 'SHAPE' AND 'GEOMETRY'. |
|---|---|
| INTEGERS | WORDS INDICATING INTEGER VALUES. FOR EXAMPLE, '0', '58', '-40', AND '+77'. |
| REAL NUMBERS | WORDS INDICATING REAL NUMBER VALUES. FOR EXAMPLE, '1.0', '5.8f', '.789' AND '-11.22'. |
| DELIMITERS | SYMBOLS SEPARATING OR GROUPING WORDS. FOR EXAMPLE, ',', '"', '{', AND '}'. |
| CHARACTER STRINGS | WORDS WITH NO ATTRIBUTES. |

$$
\begin{cases}
\sin\alpha = \dfrac{xa-xf}{\sqrt{(xf-xa)^2+(zf-za)^2}} \\
\cos\alpha = \dfrac{zf-za}{\sqrt{(xf-xa)^2+(zf-za)^2}} \\
\cos\beta = \dfrac{\sqrt{(xf-xa)^2+(zf-za)^2}}{\sqrt{(xf-xa)^2+(yf-ya)^2+(zf-za)^2}} \\
\sin\beta = \dfrac{yf-ya}{\sqrt{(xf-xa)^2+(yf-ya)^2+(zf-za)^2}}
\end{cases}
$$

$$\gamma = \begin{bmatrix} \cos\alpha & \sin\alpha\sin\beta & \sin\alpha\cos\beta & 0 \\ 0 & \cos\beta & -\sin\beta & 0 \\ \sin\alpha & -\cos\alpha\sin\beta & -\cos\alpha\cos\beta & 0 \\ -xf\cos\alpha - zf\sin\alpha & -xf\sin\alpha\sin\beta - yf\cos\beta + zf\cos\alpha\sin\beta & -xf\sin\alpha\cos\beta + yf\sin\beta + zf\cos\alpha\cos\beta & 1 \end{bmatrix}$$

FIG. 24

$$[xe\ ye\ ze\ 1] \cdot Tp = [xp\ yp\ zp\ wp]$$

$$Tp = \begin{bmatrix} 1 & 0 & 0 & 0 \\ 0 & 1 & 0 & 0 \\ 0 & 0 & \frac{kf}{h(f-h)} & \frac{k}{h} \\ 0 & 0 & -\frac{kf}{f-h} & 0 \end{bmatrix}$$

FIG. 26

VIEWPOINT COORDINATE SYSTEM

NORMALIZED PROJECTION COORDINATE SYSTEM $$[xe\ ye\ ze\ 1] \cdot Tp = [xp\ yp\ zp\ wp]$$

$$Tp = \begin{bmatrix} 1 & 0 & 0 & 0 \\ 0 & 1 & 0 & 0 \\ 0 & 0 & \frac{kf}{h(f-h)} & \frac{k}{h} \\ 0 & 0 & -\frac{kf}{f-h} & 0 \end{bmatrix}$$

$$[xe\ ye\ ze\ 1] \cdot Tp = [xp\ yp\ zp\ wp]$$

$$Tp = \begin{bmatrix} 1 & 0 & 0 & 0 \\ 0 & 1 & 0 & 0 \\ 0 & 0 & \frac{kf}{h(f-h)} & \frac{k}{h} \\ 0 & 0 & -\frac{kf}{f-h} & 0 \end{bmatrix}$$

MULTIMEDIA DOCUMENTS INTEGRATING AND DISPLAYING SYSTEM

BACKGROUND OF THE INVENTION

The present invention relates to a multimedia documents integrating and displaying system for handling information in a wide variety of formats including images, video, audio and three-dimensional graphics in a unified fashion and using them in a wide variety of combinations.

Recently, the amount of information available to an Internet user through the World Wide Web (hereafter, referred to as "Web") has been increasing exponentially. Concomitantly, the variety of formats for information, such as text, images, video, audio, three-dimensional graphics and the like, has been rapidly increasing.

However, methods for handling all information formats in a unified environment are only at an early stage of development. Especially, there is a great need for a method of handling various information formats in a unified three-dimensional space.

SUMMARY OF THE INVENTION

An object of the present invention, created in consideration of the above circumstances, is to provide a multimedia documents integrating and displaying system capable of handling various formats for information including images, video, audio and three-dimensional graphics. The aforesaid system uses an extended function of Extended Markup Language (XML) in a language specification of a unified description, and effectively combines data groups scattered across the Web to thereby allow an Web content creator or an Web user to retrieve and use required information from various and large amount of information in an optimal form.

More specifically, an object of the present invention is to provide a multimedia documents integrating and displaying system, which allows its user to specify sound, three-dimensional images, two-dimensional images and the like, and build an environment which operates at a comfortable speed without requiring single-purpose viewers and players such as plug-ins and the like.

To achieve the aforesaid objectives, according to a primary aspect of the present invention, there is provided a multimedia documents integrating and displaying system, comprising: a framework means for operating in close communication with a parser, interpreting various drawing tags in a document described in a markup language, generating a framework for synchronizing and operating various drawing primitives, and generating a two-dimensional drawing command and a three-dimensional drawing command based on the aforesaid framework; a two-dimensional rendering means for receiving the aforesaid two-dimensional drawing command from the aforesaid framework means, and creating a two-dimensional canvas capable of executing the two-dimensional drawing command on a Web browser; and a three-dimensional rendering means for receiving the aforesaid three-dimensional drawing command from the aforesaid framework means, and creating a three-dimensional canvas capable of executing the three-dimensional drawing command on the Web browser. Here, the aforesaid markup language is preferably XML. Also it is desirable that the aforesaid two-dimensional rendering means and the aforesaid three-dimensional rendering means generates graphic display data for describing a two-dimensional image or a three-dimensional image using a command set in Java AWT; and passing the graphic display data to the Web browser.

According to such a structure, it is possible to build an environment in which all functions are written in a descriptive language such as Java and the like, and easily specify sound, three-dimensional images and two-dimensional images in a framework of a markup language such as XML and the like, thereby eliminating the necessity for single-purpose viewers and players on the Web browser.

According to one embodiment of the present invention, the aforesaid framework means comprises: an execution request generation means, which is activated by the parser, for receiving call-back data corresponding to a predetermined DTD from the parser, and generating execution request description data including a description type to which a parameter is added; and a manager means for generating a two-dimensional drawing command and a three-dimensional drawing command based on the aforesaid execution request description data.

In the above case, it is preferable that the aforesaid execution request generation means comprises: an SVG means for receiving from the aforesaid parser, callback data which indicates contents of an element, an attribute name and a value based on a DTD of SVG, and generating execution request description data which indicates a two-dimensional drawing, sound, a moving image, an image, text or a hyperlink.

Also it is preferable that the aforesaid execution request generation means comprises: a CMW means for receiving from the aforesaid parser, callback data which indicates contents of an element, an attribute name and a value based on a DTD of a CMW (Cross-Media World) newly set to suit the present invention, and generating execution request description data which indicates a material of a three-dimensional graphic form, a texture, a camera, a light, a font, an interpolator, a timer, a sensor, image mapping, an XVL file or a VRML file.

Furthermore, it is preferable that the aforesaid execution request generation means comprises: a TVX means for receiving from the aforesaid parser, callback data which indicates contents of an element, an attribute name and a value based on a DTD in TVX (TVML with XML) newly set to suit the present invention, and generating execution request description data which indicates sound, a moving image, an image, a material of a three-dimensional graphic form, a texture, a camera, a light, an interpolator, a timer, a sensor or a VRML file.

According to the above structure, all functions can be described with an XML document, and a plurality of media in different formats can be easily combined.

According to the one embodiment, the aforesaid manager means comprises the means of: structuring the aforesaid execution request description data to thereby create a tree structure for an entire document described in a markup language; and generating a two-dimensional drawing command or a three-dimensional drawing command according to the execution request description data in the aforesaid tree structure to thereby express the document.

In this case, it is preferable that the aforesaid manager means further comprises the means of: mixing a two-dimensional drawing description and a three-dimensional drawing description according to a location of the execution request description data in the aforesaid tree structure; and generating a two-dimensional embedding command for embedding a two-dimensional canvas provided by the aforesaid two-dimensional rendering means in a three-dimensional canvas provided by the aforesaid three-dimensional rendering means.

According to such a structure, a two-dimensional description and a three-dimensional description can be easily combined, and therefore, a two-dimensional image can be embedded in the three-dimensional canvas. Concomitantly, the two-dimensional image embedded in the three-dimensional canvas can retain two-dimensional attributes therein.

According to the one embodiment, the aforesaid manager means further comprises: a means for converting an operation event received through the Web browser to a two-dimensional drawing command or a three-dimensional drawing command. According to such a structure, it is possible to receive an operation event from a user and generate a two-dimensional drawing command or a three-dimensional drawing command according to the operation event.

According to the one embodiment, the aforesaid framework means, the two-dimensional rendering means and the three-dimensional rendering means comprise the means of: being activated by the Web browser; and being executed after being read as objects. According to such a structure, all functions can be downloaded on demand from an Web server for execution.

According to the one embodiment, the aforesaid two-dimensional rendering means comprises: a means for receiving a two-dimensional drawing command from the aforesaid manager means, and generating a drawing method call according to a content of the two-dimensional drawing command; a two-dimensional drawing means for receiving the aforesaid drawing method call, and converting the drawing method call to media operation data; and a two-dimensional canvas means for receiving the media operation data from the two-dimensional drawing means, generating a two-dimensional canvas on the Web browser, and executing a graphic display according to the media operation data.

According to such a structure, it is possible to generate media operation data according to a two-dimensional processing type (static image, moving image, text or the like) and execute the media operation data on a two-dimensional canvas on the Web browser.

According to the one embodiment, the aforesaid two-dimensional canvas means comprises: a two-dimensional object managing means for generating a rendering request after receiving the media operation data and transferring a two-dimensional file to be used by the aforesaid two-dimensional drawing means, and requesting image data generation for an entire two-dimensional canvas based on the media operation data and the two-dimensional file; and a two-dimensional object display means for receiving the rendering request from the aforesaid two-dimensional object managing means, and setting a two-dimensional display attribute in a two-dimensional canvas according to the rendering request.

In this case, it is preferable that the aforesaid two-dimensional canvas means comprises: a two-dimensional media operation means for receiving an operation event for a two-dimensional operation from the Web browser, and passing a rendering request to the aforesaid two-dimensional object display means according to the operation event. Further in this case, it is desirable that the aforesaid two-dimensional object display means comprises the means of: passing a partial rendering request to the aforesaid two-dimensional drawing means according to the rendering request received from the aforesaid two-dimensional media operation means; and receiving the media operation data from the two-dimensional drawing means.

According to the one embodiment, the aforesaid two-dimensional canvas means comprises: a means for calculating transformation data for a two-dimensional canvas if the two-dimensional canvas is pasted to a three-dimensional canvas, and setting a two-dimensional display attribute on a transformed two-dimensional canvas according to the transformation data.

According to such a structure, a display attribute of the two-dimensional canvas can be set on a three-dimensional canvas.

According to the one embodiment, the aforesaid three-dimensional rendering means comprises: a three-dimensional scene graph generation means for reading three-dimensional data based on three-dimensional drawing commands received from the aforesaid manager means, and generating three-dimensional scene graphs for three-dimensional displays according to the three-dimensional drawing commands; a three-dimensional scene drawing means for retaining a scene graph tree, which is an accumulation of the above three-dimensional scene graphs, and generating scene drawing data by traversing the scene graph tree; and a three-dimensional canvas means for generating a three-dimensional canvas on a predetermined drawing area on the Web browser, and concomitantly generating graphic display data to be displayed on the aforesaid three-dimensional canvas based on three-dimensional scene drawing data from the aforesaid three-dimensional scene drawing means.

According to such a structure, it is possible to generate a scene graph according to a three-dimensional processing type and accumulate all scene graphs to create a tree structure. It is also possible to scan (traverse) all nodes in this tree structure from a root node, and generate three-dimensional scene drawing data to thereby combine and displaying all media. Moreover, a rendering operation can be performed using the three-dimensional canvas means to express the three-dimensional scene drawing data on the Web browser.

Here, it is preferable that the aforesaid three-dimensional scene graph generation means comprises: a means, which is activated by a three-dimensional drawing command from the aforesaid manager means, for setting or changing three-dimensional attributes including material, texture, camera, light and font style in the scene graph, and generating a scene graph with a three-dimensional attribute setting to thereby reflect a change in the three-dimensional attributes in a three-dimensional space.

Also it is preferable that the aforesaid three-dimensional scene graph generation means comprises: means, which is activated by a three-dimensional drawing command from the aforesaid manager means, for setting or changing a behavior of a scene graph, expressing a moving image animation from part of a scene or an entire scene according to a time, an event and/or the like, and generating a scene graph from a three-dimensional behavior setting to thereby reflect a change of the three-dimensional behavior in the three-dimensional space. In this case, the three-dimensional drawing command from the aforesaid manager means comprises: information on a sensor, a timer and an interpolation for defining a behavior of a three-dimensional animation.

According to such a structure, there is provided a means for setting a behavior for a scene graph and expressing the moving image animation from part of a scene or an entire scene according to a time, an event and/or the like. More specifically, there can be provided a means capable of specifying behaviors including walking, sitting, standing, bowing and looking, for a three-dimensional CG character.

According to the one embodiment, the aforesaid three-dimensional scene graph generation means comprises: a two-dimensional embedding means for receiving a three-dimensional drawing command from the aforesaid manager means for embedding two-dimensional image data, and generating a scene graph in which the two-dimensional image data becomes embedded. In this case, it is desirable that this two-dimensional embedding means comprises the means of: receiving from the aforesaid manager means a three-dimensional drawing command which includes an image mapping setting for mapping an image to a three-dimensional image; and generating a scene graph for setting a texture for image mapping in the scene graph tree retained by the aforesaid three-dimensional scene drawing means. Also, it is preferable that the aforesaid two-dimensional embedding means comprises: a hyperlink setting means for receiving hyperlink data as well as two-dimensional image data as a three-dimensional drawing command if a hyperlink is set in a two-dimensional image to be embedded, and generating a scene graph for embedding two-dimensional data which includes hyperlink information therein.

According to such a structure, it is possible to generate an area for displaying two-dimensional rendering in a three-dimensional space, paste a two-dimensional image in the three-dimensional space while retaining two-dimensional attributes of the two-dimensional image, and furthermore specify these expressions within an XML scheme easily.

According to the one embodiment, the aforesaid three-dimensional scene graph generation means comprises: an XVL loader means, which is activated by a three-dimensional drawing command from the aforesaid manger means, for reading an external XVL file, retrieving a lattice-shaped three-dimensional element using a Lattice kernel, converting the lattice-shaped three-dimensional element into a rounded three-dimensional element, and generating a scene graph.

According to such a structure, it is possible to read an XVL file, retrieve a three-dimensional basic element by using a "Lattice kernel means", and generate a scene graph. In this case, there is preferably provided a means for downloading the "Lattice kernel means" as a Java class library from a Web server to a client personal computer, and executing the "Lattice kernel means" on the Web browser. Moreover, it is desirable that display objects including an XVL-described personage (a three-dimensional CG character) and a studio set can be read, and that a plurality of display objects can be displayed on the same scene graph.

According to the one embodiment, the aforesaid three-dimensional scene graph generation means comprises: a VRML loader means, which is activated by a three-dimensional drawing command from the aforesaid manager means, for reading an external VRML file, analyzing a content of the external VRML file, retrieving a thee-dimensional basic element, and a relationship and a movement of the three-dimensional basic element, and generating a scene graph.

According to such a structure, it is possible to read a VRML file, analyze syntax of the VRML file, retrieve a VRML-described thee-dimensional basic element, and a relationship and a movement of the three-dimensional basic element, and generate a scene graph. Especially, it is desirable that display objects including a VRML-described personage (a three-dimensional CG character) and a studio set can be read, and that a plurality of display objects can be displayed on the same scene graph.

According to the one embodiment, the aforesaid three-dimensional scene drawing means comprises: a three-dimensional scene graph construction means for receiving a plurality of scene graphs according to a content of a three-dimensional drawing command from the aforesaid scene graph generation means, generating a scene graph tree of scenes to be displayed using structured group nodes and reel nodes based on the scene graphs, and concomitantly performing an addition, a deletion or a change for the scene graphs in the aforesaid scene graph tree; and a means for receiving the aforesaid scene graph tree from the aforesaid three-dimensional scene graph construction means, scanning (traversing) all nodes in this scene graph tree from its root node, converting a coordinate system of polygon shape data (a modeling coordinate system), defined in each node, to a three-dimensional coordinate system in a three-dimensional space (a world coordinate system), and thereby generating scene drawing data.

In this case, it is preferable that the aforesaid scene drawing data includes rendering mode data generated from non-polygon shape data retained in the scene graph tree.

Also in this case, it is preferable that there is further included a view control means for receiving a scene graph indicating a content of a camera in the scene graph tree, converting a coordinate to change a viewpoint in a three-dimensional scene, and passing the scene graph with a changed viewpoint to the aforesaid scene drawing means.

According to the one embodiment, the aforesaid three-dimensional canvas means comprises: a view coordinate conversion means for receiving scene drawing data including the polygon shape data from the aforesaid three-dimensional scene drawing means, and normalizing coordinates of the polygon shape data to draw the polygon shape data in two dimensions on the three-dimensional canvas; and a means for receiving normalized projection scene drawing data from the aforesaid view coordinate conversion means, and generating graphic display data while buffering image drawing data to display images eliminated by hidden surface removal in the aforesaid three-dimensional canvas.

In this case, it is desirable that the aforesaid three-dimensional canvas means further comprises: a means for receiving scene drawing data excluding the polygon shape data from the aforesaid three-dimensional scene drawing means, and generating a rendering mode according to the scene drawing data. Also the aforesaid three-dimensional canvas means preferably comprises: a means for generating three-dimensional canvas information based on an operation event from the Web browser for the three-dimensional canvas, and passing the three-dimensional canvas information to the aforesaid scene drawing means.

Other characteristics and marked effects of the present invention will become apparent upon referring to explanations of the following specification when taken in conjunction with the accompanying drawings.

BRIEF DESCRIPTION OF THE DRAWINGS

FIG. 24 is a diagram showing a formula required for calculating three-dimensional scene drawing of the one embodiment;

FIG. 26 is a diagram showing still other formulae required for calculating the three-dimensional scene drawing of the one embodiment;

DETAILED DESCRIPTION OF THE PREFERRED EMBODIMENT

Embodiments of the present invention will be described below based on the accompanying drawings.

Figure 1:
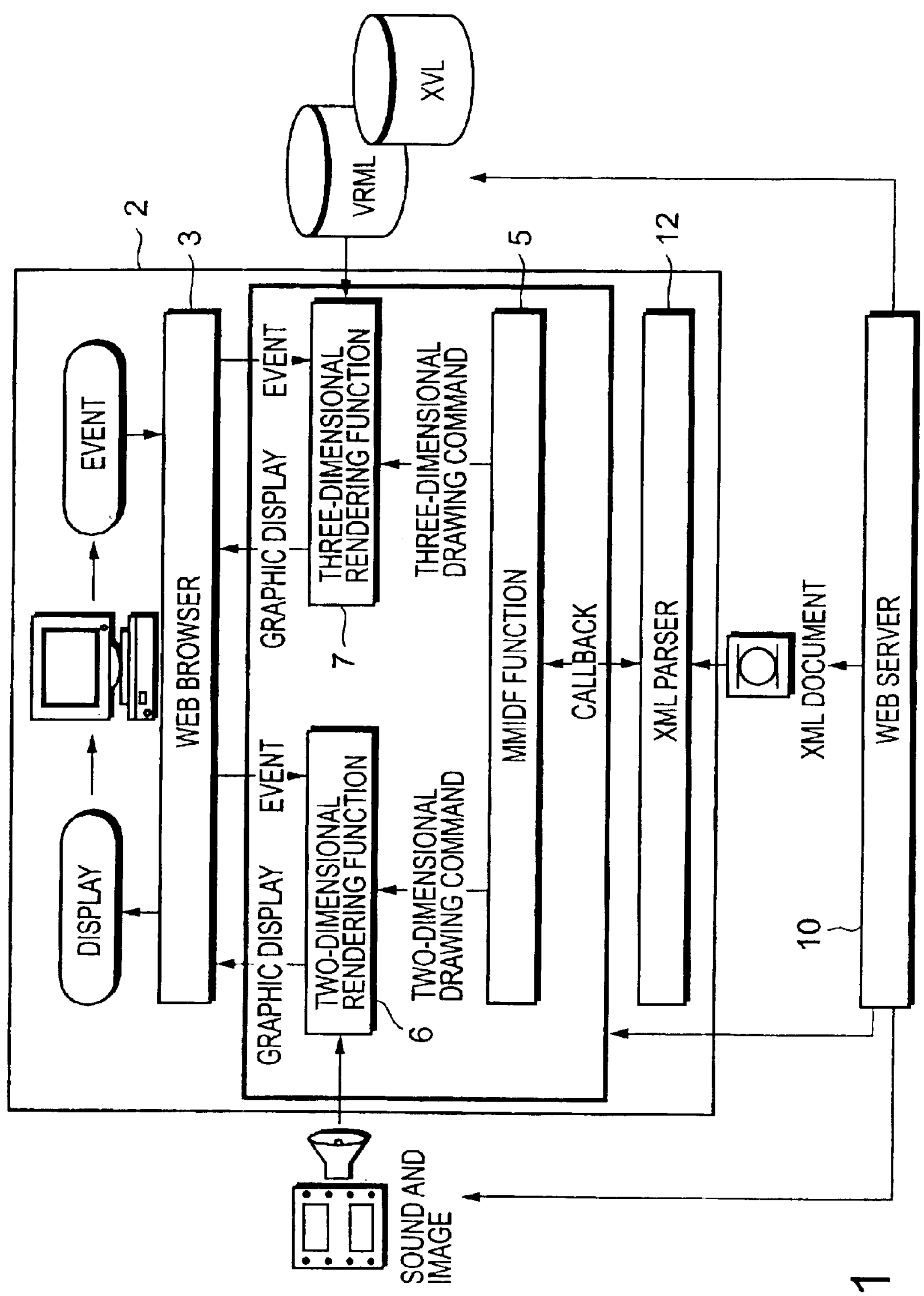
FIG. 1 is a function block diagram showing the entire structure of one embodiment of the present invention.

FIG. 1 is a schematic structural view showing a system 1 for integrating and displaying multimedia documents (cross-media spaces) according to one embodiment of the present invention.

(Basic Structure)

This system uses XML (Extensible Markup Language) and realizes an environment for displaying combined media data on a Web browser 3 in an environment of a client personal computer 2.

This system comprises an MMIDF function section 5 (MMIDF: Multiple Multimedia Interconnected Document Framework; a framework function section of the present invention), which realizes a function for joining renderers for handling each medium while complying with XML description rules, a two-dimensional rendering function section 6 for realizing a two-dimensional graphic form drawing, a sound execution, a moving image execution and a hyperlink while complying with a drawing command received from the MMIDF function section 5, and a three-dimensional rendering function section 7 for reading a three-dimensional shape indicating a content in VRML/XVL, displaying the three-dimensional shape read, and realizing an attribute setting and a movement for the displayed three-dimensional shape.

Each component will be described in detail below.

(MMIDF Function Section)

This MMIDF function section 5 is activated by the Web browser 3 and downloaded together with an XML document 11 as objects from a Web server 10 to the client personal computer 2 for execution.

This MMIDF function section 5 operates in close communication with an XML parser 12 and interprets various drawing tags which are defined in an XML document as tags in two-dimensional graphic forms and three-dimensional graphic forms. The MMIDF function section 5 has a function for generating a two-dimensional drawing command or a three-dimensional drawing command for combining and displaying primitives, and passing the two-dimensional drawing command or the three-dimensional drawing command to the aforesaid two-dimensional rendering function section 6 or three-dimensional rendering function section 7, respectively.

In other words, unlike HTML, this system is a Web application for incorporating XML, Extensible Markup Language, to therefore express a “cross-media space”. Here, XML itself is simply a meta-language for defining well-formed syntax. Therefore, first, it is required to interpret a content of the XML document through the XML parser 12.

Figure 2:
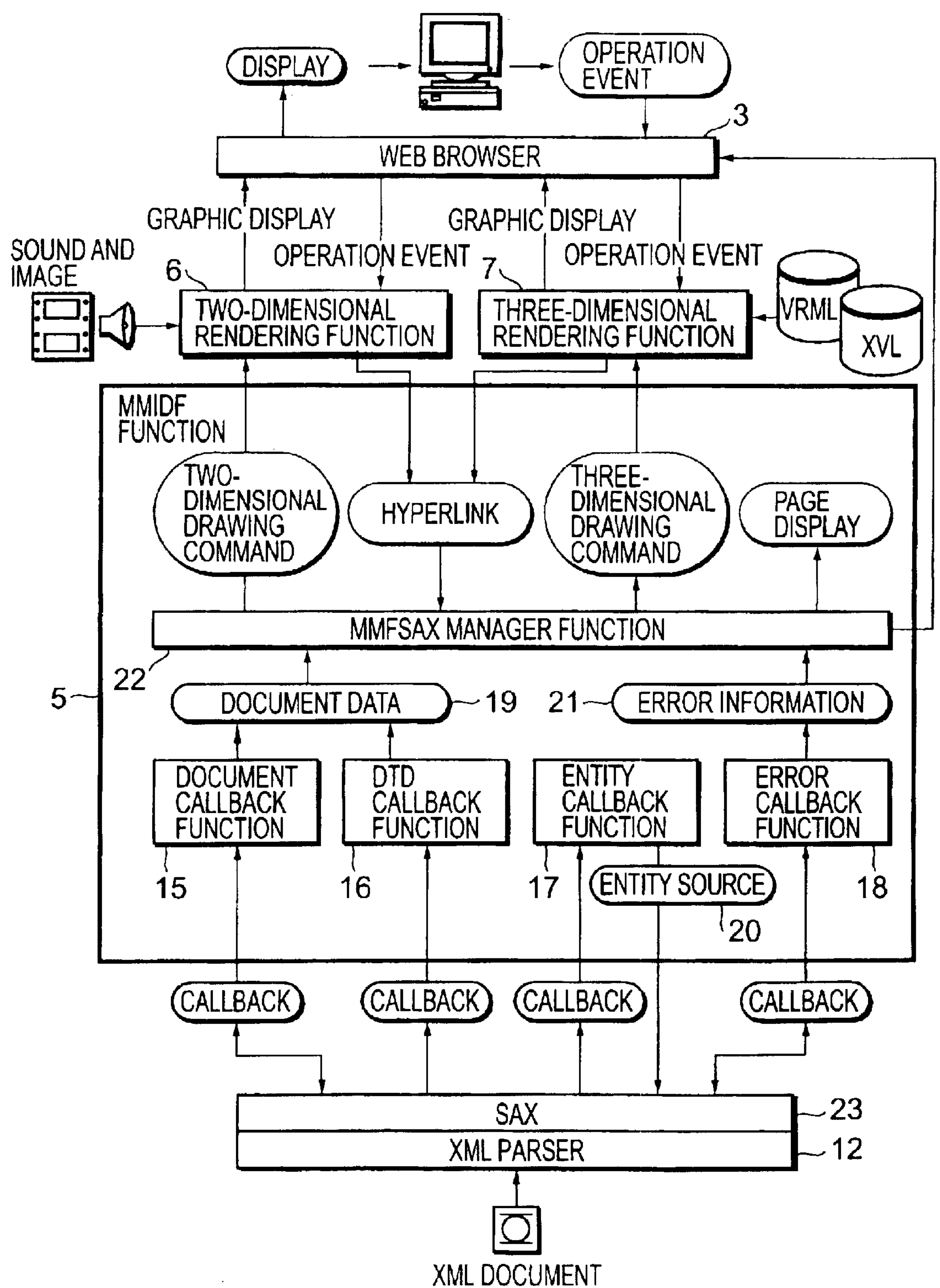
FIG. 2 is a function block diagram describing details of an MMIDF function section of the one embodiment.

Each time the XML parser 12 recognizes a starting tag or text during a syntax analysis of XML document, the XML parser 12 passes callback data to the MMIDF function section 5. FIG. 2 is a block diagram showing this MMIDF function section 5 in detail (shown in the thick frame). The callback data is passed to a document callback function section 15, a DTD callback function section 16 or an entity callback function section 17 if the XML parser 12 recognizes an element tag, an entity for non-perspective projection or an entity for perspective projection in the XML document (URL information), respectively. The callback data is passed to an error callback function section 18 if an error occurs during the syntax analysis of the XML document.

The aforesaid document callback function section 15 becomes activated by the aforesaid XML parser 12 (callback), detects a beginning and an end of an element description in a description content of the XML document, sets a tag type as an identifier, and generates "document data" 19, which includes an additional parameter and a processing type for the identifier. This document data 19 comprises a drawing type (two-dimensional or three-dimensional), a tag type and the additional parameter.

The aforesaid DTD callback function section 16 becomes activated (callback) if the XML parser 12 detects NOTATION, ELEMENT, or ELEMENTS description, which is not supported by this system, and generates the document data 19 as an external application execution request. This document data 19 comprises an external application name, a system identifier and a public identifier. Incidentally, if the external application to be activated is not installed in an execution environment in this system, the description is discarded.

The aforesaid entity callback function section 17 becomes activated by the XML parser 12 (callback) if an external entity is defined in the description in the XML document, and provides a function for reading a specified document. This entity callback function section 17 has a function for reading an entity source 20 and passing it to the aforesaid the XML parser 12.

The error callback function section 18 becomes activated if a syntax error occurs in the XML parser 12 (callback) and identifies a location of an error and generates error information 21. Here, the error information 21 includes an error code and a line number where the error occurred.

A MMDSAX manager function section 22 receives and converts the document data 19 and the error information 21, and generates a two-dimensional drawing command or a three-dimensional drawing command.

Incidentally, the document callback function section 16 should be further explained in detail here. This document callback function section 16 generates the document data 19, which indicates a content of a two-dimensional graphic form, sound, a moving image, an image, text, a hyperlink, a material of a three-dimensional graphic form, a texture, a camera, a light, a font, an interpolator, a timer, a sensor, image mapping, an XVL file or a VRML file.

More specifically, an event-driven SAX23 is employed for the syntax analysis of the XML document in this system, and this document callback function section 16 receives an element name, an attribute name and a value as information of the XML document from an interface of a document handler of SAX23 (a type of callback).

Since one element may comprise one callback, a plurality of callbacks or a plurality of elements, this document callback function section 16 can receive contents of a plurality of callbacks and generate the document data 19.

Figure 3:
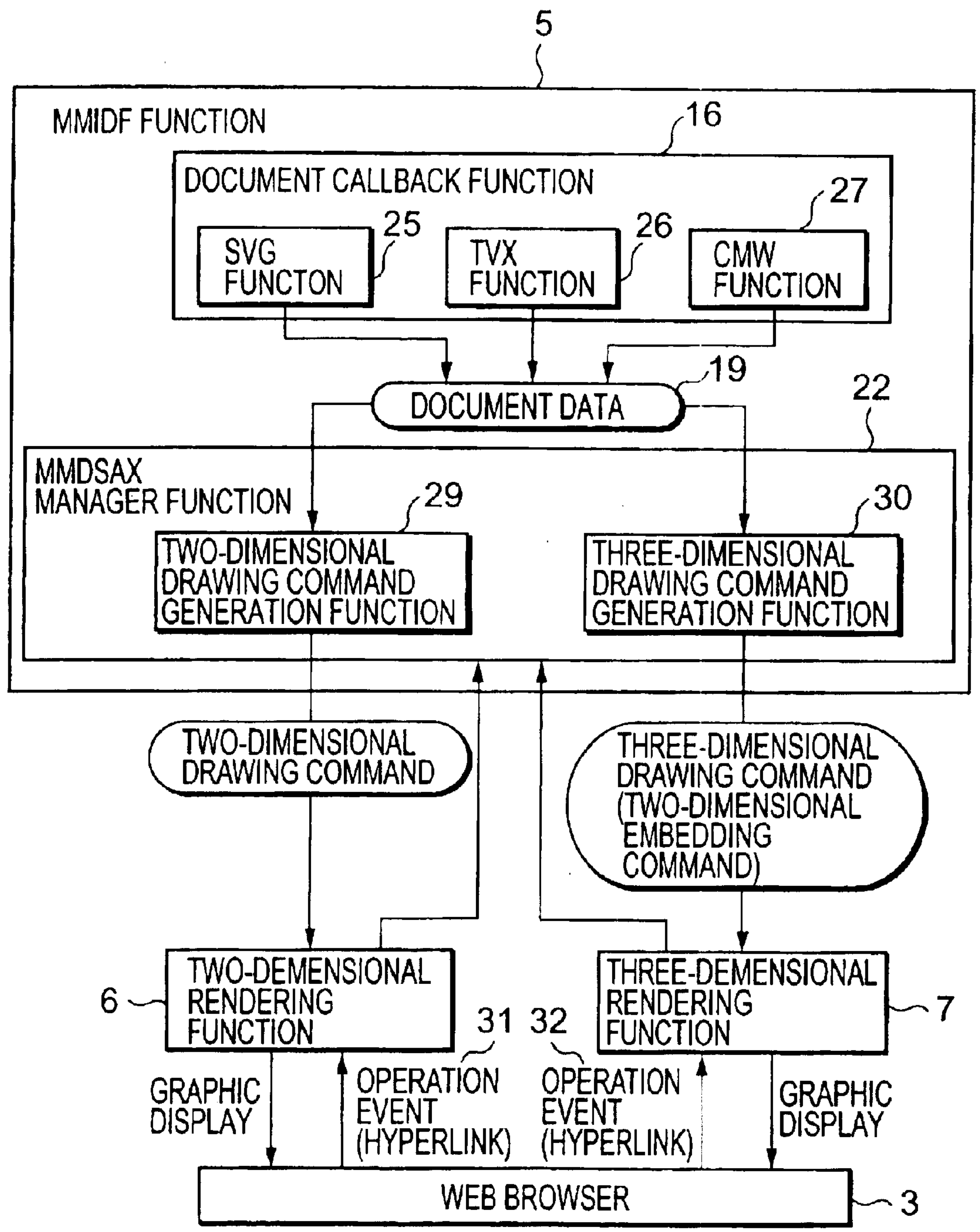
FIG. 3 is a function block diagram describing details of a document callback function section of the one embodiment.

Also this document callback function section 16 has an SVG function section 25, a TVX function section 26 and a CMW function section 27 as shown in FIG. 3.

The SVG function section 25 receives callback data indicating a content of an element, an attribute name and a value, based on a DTD of SVG 1.0 (Scalable Vector Graphics 1.0) specified by W3C, from the XML parser 12, and generates the document data 19 comprising a two-dimensional drawing, sound, a moving image, an image, text or a hyperlink. This document data 19 is passed to a two-dimensional drawing command generation function section 29 of the MMDSAX manager function section 22 described later.

This SVG function section 25 supports the following elements of SVG. If other elements are received, the document data 19 is not generated.

svg
g
rect
circle
ellipse
line
polyline
polygon
text
font
image
symbol
marker
sound
movie
xlink The CMW function section 27 receives callback data indicating a content of an element, an attribute name and a value, based on a DTD of a CMW (Cross Media World) specified as cross media in the present invention, from the XML parser 12, and generates the document data 19 comprising a material of a three-dimensional graphic form, a texture, a camera, a light, a font, an interpolator, a timer, a sensor, image mapping, an XVL file or a VRML file. This document data 19 is passed to a three-dimensional drawing command generation function section 30 described later.

A DTD of a CMW specified in this system is as follows:

```
    •Appearance
<!ELEMENT appearance (material?,
(imageTexture|svgTexture)?)>
    •Background
<!ELEMENT background (color?, imageTexture?)>
<!ATTLIST background enabled (T|F) “T”
        stretchToFit (T|F) “F”>
<!ELEMENT color EMPTY>
<!ATTLIST color r CDATA “0” g CDATA “0” b CDATA “0”>
    •DirectionalLight
<!ELEMENT directionalLight (color?, direction?)>
<!ATTLIST directionalLight intensity CDATA “1” on
 (T|F) “T”>
<!ELEMENT direction EMPTY>
<!ATTLIST direction x CDATA “0” y CDATA “0” z CDATA “-
1”>
    •Group
<!ELEMENT group
 (background | directionalLight | shape | transform |
viewpoint)+>
SvgTexture
<!ELEMENT svgTexture (svg)>
<!ATTLIST   repeatS (T|F) “T”
    repeatT (T|F) “T”>
    •ImageTexture
```

-continued

```
<!ELEMENT imageTexture EMPTY>
<!ATTLIST imageTexture url   CDATA #REQUIRED
          repeatS (T|F) "T"
          repeatT (T|F) "T">
     •IndexedFaceSet
<!ELEMENT indexedFaceSet (coord?, coordIndex?, colors?,
colorIndex?, texCoord?, texCoordIndex?)>
<!ATTLIST indexedFaceSet     ccw      (T|F) "T"
               creaseAngle CDATA "0"
               solid   (T|F) "T">
<!ELEMENT colors              (color3*)>
<!ELEMENT color Index         (path*)>
<!ELEMENT coord          (p3*)>
<!ELEMENT coordIndex          (path*)>
<!ELEMENT texCoord            (p2*)>
<!ELEMENT texCoordIndex       (path*)
<!ELEMENT path           (i*)>
<!ELEMENT p3 EMPTY>
<!ATTLIST p3 x CDATA #REQUIRED
          y CDATA #REQUIRED
          z CDATA #REQUIRED>
<!ELEMENT p2 EMPTY>
<!ATTLIST p2 s CDATA #REQUIRED
          t CDATA #REQUIRED>
<!ELEMENT i (#PCDATA)>
     .IndexedLineSet
<!ELEMENT indexedLineSet (coord?, coordIndex?, colors?,
colorIndex?)>
<!ATTLIST indexedLineSet lineWidth CDATA "1">
     •Material
<!ELEMENT material (diffuseColor?, emissiveColor?)>
<!ATTLIST material transparency CDATA "0">
<!ELEMENT diffuseColor   EMPTY>
<!ELEMENT emmisiveColor EMPTY>
<!ATTLIST diffuseColor   r CDATA "0"   g CDATA "0"   b
CDATA "0">
<!ATTLIST emissiveColor r CDATA "0" g CDATA "0" b CDATA
"0">
     •OrientationInterpolator
<!ELEMENT      orientationInterpolator    (key?,
keyOrientation?)>
<!ELEMENT key       (f*)>
<!ELEMENT keyOrientation (orientation*)>
<!ELEMENT orientation EMPTY />
<!ELEMENT f (#PCDATA)>
<!ATTLIST orientation x CDATA "0" y CDATA "0" z CDATA
"1"
     radians CDATA "0">
     •PositionInterpolator
<!ELEMENT positionInterpolator (key?, keyPosition?)>
<!ELEMENT keyPosition (p3*)>
<!ELEMENT p3 EMPTY>
<!ATTLIST p3 x CDATA #REQUIRED
          y CDATA #REQUIRED
          z CDATA #REQUIRED>
     •Shape
<!ELEMENT          shape              (appearance?,
(indexedLinsSet|indexedFaceSet)?)>
     •Timer
<!ELEMENT          timer         (orientationInterpolator?,
positionInterpolator)>
<!ATTLIST timer loop (T|F) "F">
<!ATTLIST target field CDATA>
     •Transform
<!ELEMENT transform (center?, rotation?, scale?,
          scaleOrientation?, translation?, children?)>
<!ELEMENT center EMPTY>
<!ATTLIST center x CDATA "0" y CDATA "0" z CDATA "0">
<!ELEMENT rotation EMPTY>
<!ATTLIST rotation x CDATA "0" y CDATA "0" z CDATA "1"
        radians CDATA "0">
<!ELEMENT scale EMPTY>
<!ATTLIST scale x CDATA "1" y CDATA "1" z CDATA "1">
<!ELEMENT scaleOrientation EMPTY>
<!ATTLIST scaleOrientation x CDATA "0" y CDATA "0" z
CDATA "1"
               radians CDATA "0">
```

-continued

```
<!ELEMENT translation EMPTY>
<!ATTLIST translation x CDATA "0" y CDATA "0" z CDATA
"0">
<!ELEMENT children
 (background | directionalLight | shape | transform |
viewpoint)*>
     •Viewpoint
<!ELEMENT    viewpoint   (description?,   orientation?,
position?)>
<!ATTLIST viewpoint enabled (T|F) "T"
          fieldOfView CDATA "0.785398">
<!ELEMENT description (#PCDATA)>
<!ELEMENT orientation EMPTY />
<!ATTLIST orientation x CDATA "0" y CDATA "0" z CDATA
"1"
          radians CDATA "0">
<!ELEMENT position EMPTY />
<!ATTLIST position x CDATA "0" y CDATA "0" z CDATA "10"
/>
```

Also the aforesaid TVX function section 27 receives callback data indicating a content of an element, an attribute name and a value, based on a DTD of TVX (TVML with XML) specified as cross media, from the XML parser 12, and generates the document data 19 comprising sound, a moving image, an image, a material of a three-dimensional graphic form, a texture, a camera, a light, an interpolator, a timer, a sensor or a VRML file. This document data 19 is passed to both the two-dimensional drawing command generation function section 29 and the three-dimensional drawing command generation function section 30 of the MMD-SAX manager function section 22 described in detail later.

A DTD of TVX specified in this system is as follows:

```
    •tvx
    <!ELEMENT tvx (character | camera) * >
    •character
<!ELEMENT character
 (casting | openmodel | bindmodel | visible | position |
 walk | sit | stand | turn | bow | look) * >
     •casting
<!ELEMENT casting EMPTY>
<!ATTLIST casting name CDATA #REQUIRED>
     •openmodel
<!ELEMENT openmodel EMPTY>
<!ATTLIST openmodel modelname CDATA #REQUIRED
               filename CDATA #REQUIRED>
     •bindmodel
<!ELEMENT bindmodel EMPTY>
<!ATTLIST bindmodel name      CDATA #REQUIRED
               modelname CDATA #REQUIRED>
     •visible
<!ELEMENT visible EMPTY>
<!ATTLIST visible name   CDATA #REQUIRED
          switch (on | off) "off">
     •position
<!ELEMENT position EMPTY>
<!ATTLIST position name CDATA #REQUIRED
          x     CDATA "0.0"
          y     CDATA "0.0"
          z     CDATA "0.0"
          d     CDATA "0.0"
          posture (standing | sitting) "standing">
     •walk
<!ELEMENT walk EMPTY>
<!ATTLIST walk name CDATA #REQUIRED
          x     CDATA "0.0"
          y     CDATA "0.0"
          z     CDATA "0.0"
          d     CDATA "0.0"
       stopmode (stop | continue | stump) "stop"
          pitch CDATA "0.0"
```

-continued

```
        compass CDATA "0.0"
          step CDATA "0.0"
          wait (yes | no) "yes">
    •sit
<!ELEMENT sit EMPTY>
<!ATTLIST sit name CDATA #REQUIRED
          speed CDATA "0.0"
        hiplevel CDATA "0.0"
          wait (yes | no) "yes">
    •stand
<!ELEMENT stand EMPTY>
<!ATTLIST stand name CDATA #REQUIRED
          speed CDATA "0.0"
          wait (yes | no) "yes">
    •turn
<!ELEMENT turn EMPTY>
<!ATTLIST turn name CDATA #REQUIRED
            d    CDATA "90"
          speed CDATA "0.0"
          style (spin | stump | walk) "spin"
          wait (yes | no) "yes">
    •bow
<!ELEMENT bow EMPTY>
<!ATTLIST bow name CDATA #REQUIRED
          style (normal | casual) "normal"
          speed CDATA "0.0"
          level CDATA "0.0"
          wait (yes | no) "yes">
    •look
<!ELEMENT look EMPTY>
<!ATTLIST look name CDATA #REQUIRED
          what (name | cameraname) #REQUIRED
          track (on | off) "on"
          speed CDATA "0.0"
          wait (yes | no) "yes">
    •camera
<!ELEMENT camera (assign | switch | movement |
closeup) * >
    •assign
<!ELEMENT assign EMPTY>
<!ATTLIST assign cameraname CDATA #REQUIRED>
    •switch
<!ELEMENT switch EMPTY>
<!ATTLIST switch cameraname CDATA #REQUIRED>
    •movement
<!ELEMENT movement EMPTY>
<!ATTLIST movement cameraname CDATA #REQUIRED
              pan       CDATA "0.0"
              tilt      CDATA "0.0"
              roll      CDATA "0.0"
              x         CDATA "0.0"
              y         CDATA "0.0"
              z         CDATA "0.0"
              vangle    CDATA "0.0"
            transition   (immediate | continuous)
"continuous"
            style        (servo | uniform) "servo"
            speed        CDATA "0.0"
            wait         (yes | no) "yes">
    •closeup
<!ELEMENT closeup EMPTY>
<!ATTLIST closeup cameraname CDATA #REQUIRED
            what    (name | propname) #REQUIRED
          transition    (immediate | continuous)
"continuous"
            dolly    (on | off) on
          adjustangle    CDATA "0.0"
          adjusttilt     CDATA "0.0"
          adjustroll     CDATA "0.0"
          adjustx        CDATA "0.0"
          adjusty        CDATA "0.0"
          adjustz        CDATA "0.0"
          adjustvangle   CDATA "0.0"
            wait    (yes | no) "yes">
```

As stated previously, the MMDSAX manager function section 22, which receives the document data 19, has the two-dimensional drawing command generation function section 29 and the three-dimensional drawing command generation function section 30. This MMDSAX manager function section 22 has a function for receiving the document data 19 and the error information 21 from the aforesaid document callback function section 15, DTD callback function section 16 and error callback function section 18, and converting the document data 19 or the error information 21 to a two-dimensional drawing command or a three-dimensional drawing command using the two-dimensional drawing command generation function section 29 or the three-dimensional drawing command generation function section 30, respectively.

That is, this MMDSAX manager function section 22 internally generates a tree structure by organizing the document data 19 for the entire document structure based on the XML document, and generates two-dimensional drawing command data or three-dimensional drawing command data to express the tree structure according to the document data therein. Furthermore, if there is a two-dimensional description at a lower level than the three-dimensional description in the tree structure, the MMDSAX manager function section 22 performs mixing of the three-dimensional description and the two-dimensional description, and provides a function for handling a two-dimensional canvas on a two-dimensional embedding command inserted in a three-dimensional canvas. This two-dimensional embedding command is passed to the aforesaid three-dimensional rendering function section 7 as a three-dimensional drawing command.

Also the MMDSAX manager function section 22 has a function for converting an operation event 31 and an operation event 32 received through the aforesaid Web browser 3 to a two-dimensional drawing command and a three-dimensional drawing command, respectively. That is, this MMDSAX manager function section 22 receives a mouse operation, a keyboard input or the like as an operation event in a canvas generated on the Web browser 3, and calls a linked document and returns it to the Web browser 3 if any link to a URL, another type of document or the like exists.

Incidentally, a two-dimensional drawing command has following types: a two-dimensional graphic form drawing command, a sound control command, a moving image control command, an image control command, text control command and a hyperlink command. Also a three-dimensional drawing command has following types: a three-dimensional scene drawing command, a three-dimensional scene attribute setting command, a three-dimensional scene behavior command, an XVL file request and a VRML file request.

Next, structures and functions of the two-dimensional rendering function section 6 and the three-dimensional rendering function section 7 will be described in detail.

(Two-dimensional Rendering Function Section)

Figure 4:
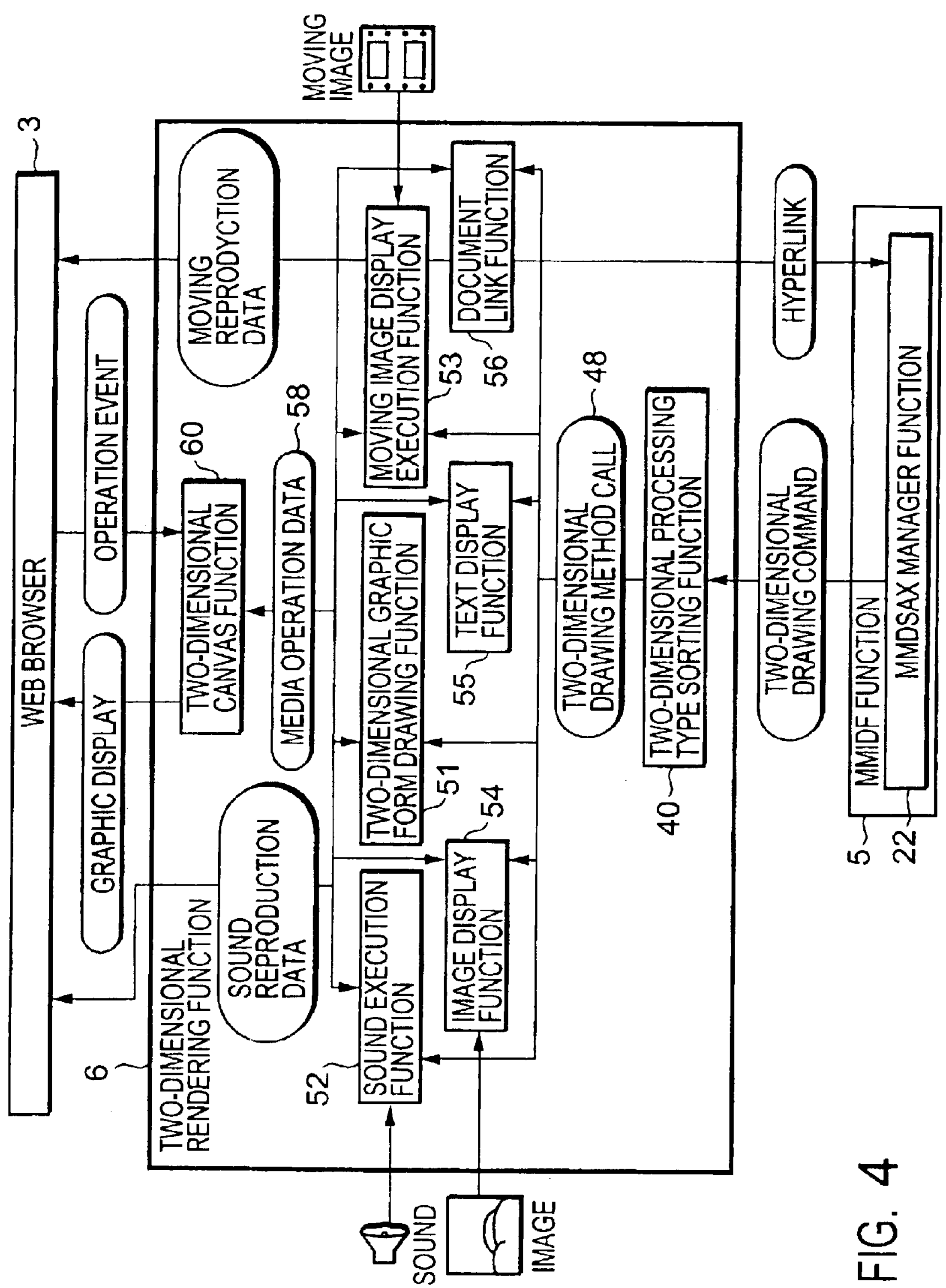
FIG. 4 is a function block diagram describing details of a two-dimensional rendering function section of the one embodiment.

FIG. 4 is a function block diagram showing only the two-dimensional rendering function section 6.

This two-dimensional rendering function section 6 is activated by the Web browser 3, and downloaded as an object from the Web server 10 to the client personal computer 2 for execution. This two-dimensional rendering function section 6 provides a function for generating a drawing canvas on the Web browser 3 according to a two-dimensional drawing command from the aforesaid MMIDF function section 5 and displaying a two-dimensional image. Moreover, this function section provides a function for determining a type of two-dimensional metadata included in the two-dimensional drawing command, and executing a drawing method corresponding to the type of the two-dimensional metadata (a two-dimensional graphic form drawing function, a sound execution function, a moving image execution display function, an image display function, a text display function or a document link function), which is handled by a two-dimensional processing type sorting function section 40.

The following are described in detail in accordance with FIG. 4 and subsequent figures.

Fist, as mentioned above, the two-dimensional drawing command generation function section 29 (refer to FIG. 3), located in the aforesaid MMDSAX manager function section 22, uses a syntax analysis of the XML document performed by the SVG function section 25 or the TVX function section 26 of the aforesaid document callback function section 16 to receive the document data 19 indicating a two-dimensional graphic form, sound, a moving image, an image, text or a hyperlink, retains a tree structure comprising an internal accumulation of document data, interprets a content of each document data, generates two-dimensional drawing command data, and passes the two-dimensional drawing command data to the two-dimensional rendering function section 6.

Figure 5:
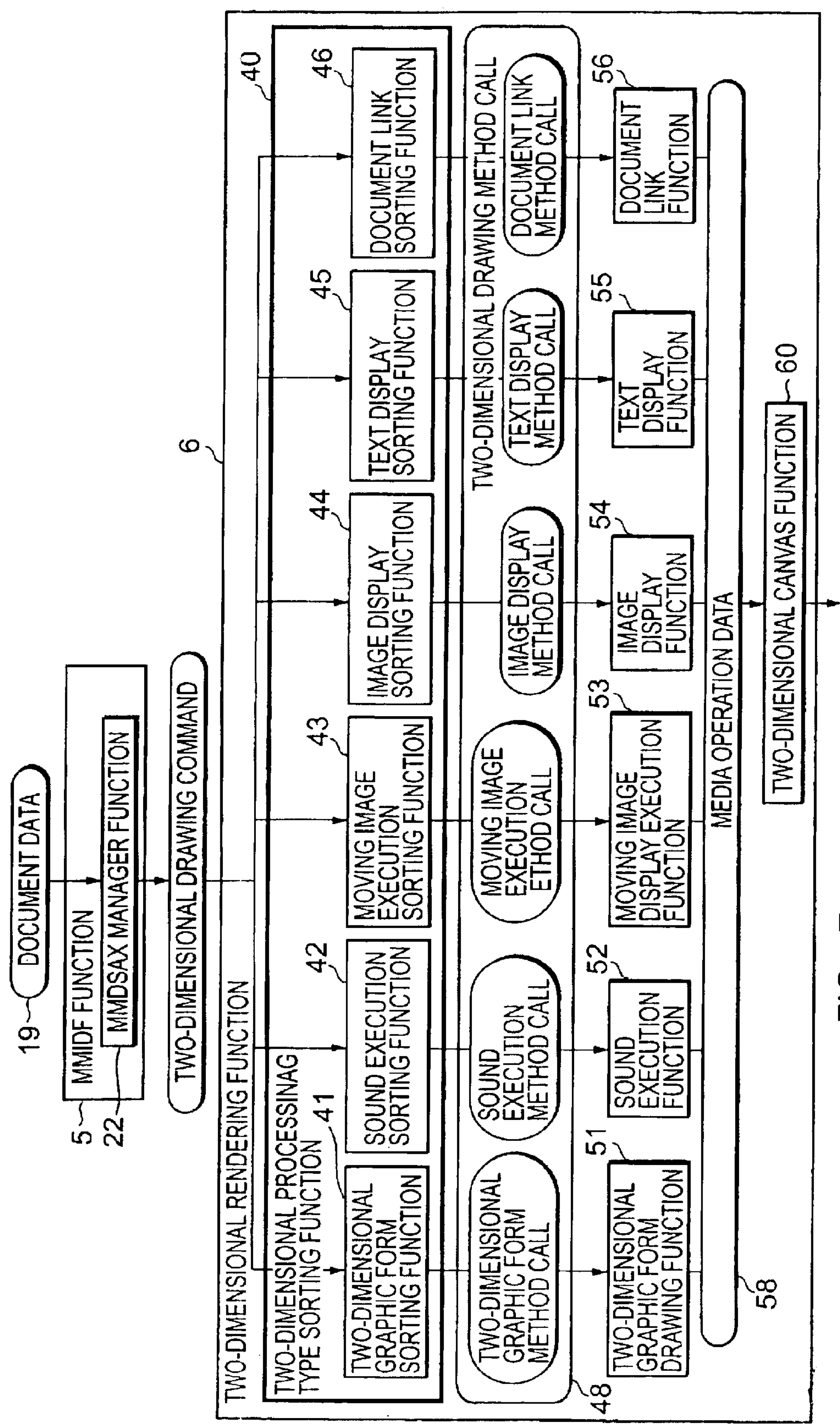
FIG. 5 is a function block diagram describing details of a two-dimensional processing type sorting function section of the one embodiment.

This two-dimensional drawing command data is sent as an output to the two-dimensional processing type sorting function section 40 in the two-dimensional rendering function section 6 shown in FIG. 4. This two-dimensional rendering function section 6 sorts a drawing command, and passes it to a two-dimensional graphic form sorting function section 41, a sound execution sorting function section 42, a moving image execution sorting function section 43, an image display sorting function section 44, a text display sorting function section 45 or a document link sorting function section 46 shown in FIG. 5 depending on a content of the drawing command.

Namely, in the aforesaid MMDSAX manager function section 22, if the document data 19 indicates a line or a two-dimensional graphic form (comprising a circle, an arc, a rectangle, an ellipse, a polygon or a filled polygon), two-dimensional drawing command data corresponding to the line or the two-dimensional graphic form is generated and passed to the two-dimensional graphic form sorting function section 41.

If the document data 19 is sound data, two-dimensional drawing command data comprising a streaming sound or a regular sound is generated and passed to the sound execution sorting function section 42.

If the document data 19 is moving image data, two-dimensional drawing command data comprising a streaming moving image or a regular moving image is generated and passed to the moving image execution sorting function section 43.

If the document data 19 is image data, two-dimensional drawing command data comprising a GIF file or a JPEG file is generated and passed to the image display sorting function section 44.

If the document data 19 is text data, two-dimensional drawing command data comprising a one-line text or a multi-line text is generated and passed to the text display sorting function section 45.

If the document data 19 is hyperlink data, two-dimensional drawing command data comprising a movement hyperlink, an open hyperlink or an embedding hyperlink is generated and passed to the document link sorting function section 46.

Each of the sorting function sections 41–46 generates a two-dimensional drawing method call 48, which calls respective two-dimensional drawing method of a two-dimensional graphic form drawing function section 51, a sound execution function section 52, a moving image display execution function section 53, an image display function section 54, a text display function section 55 and a document link function section 56 based on a two-dimensional drawing command received from the MMDSAX manager function section 22.

The two-dimensional graphic form drawing function section 51 has a function for receiving the aforesaid two-dimensional drawing method call 48, and converting it to media operation data 58. A two-dimensional basic element drawing object (a line, an arc, a rectangle or a polygon) and its operation data (drawing, moving, rotation, reduction or enlargement) are generated as the media operation data 58.

The sound execution function section 52 receives the aforesaid two-dimensional drawing method call 48 for playing sound, generates an execution object based on a sound file, and generates a GUI component for an operational use (start, stop, execution speed, fast forward or rewind) and its operation data (media operation data 58) for the execution object.

The moving image display execution function section 53 receives the two-dimensional drawing method call 48 for playing a moving image, generates an execution object based on an image file, and generates a GUI component for an operational use (start, stop, execution speed, fast forward or rewind) and its operation data (media operation data 58) for the execution object.

The image display function section 54 receives the two-dimensional drawing method call 48 for displaying an image, and generates an image drawing object (an image format specification, an image area specification and the like) and its operation data (drawing, moving or rotation) (media operation data 58).

The text display function section 55 receives the two-dimensional drawing method call 48 for displaying text, and generates a text object (an image format specification, an image area specification and the like) and its operation data (drawing, moving or rotation) (media operation data 58).

The document link function section 56 receives the two-dimensional drawing method call 48 for displaying a hyperlink to an external document, and generates information which indicates the location of the external document (media operation data 58).

The media operation data 58 generated by the aforesaid two-dimensional graphic form drawing function section 51, sound execution function section 52, moving image display execution function section 53, image display function section 54, text display function section 55, or document link function section 56 is passed to a two-dimensional canvas function section 60.

As shown in FIG. 4, this two-dimensional canvas function section 60 provides a function for receiving the aforesaid 6 types of the media operation data 58, generating a two-dimensional canvas on the Web browser 3, and executing a graphics display corresponding to each media operation function.

Figure 6:
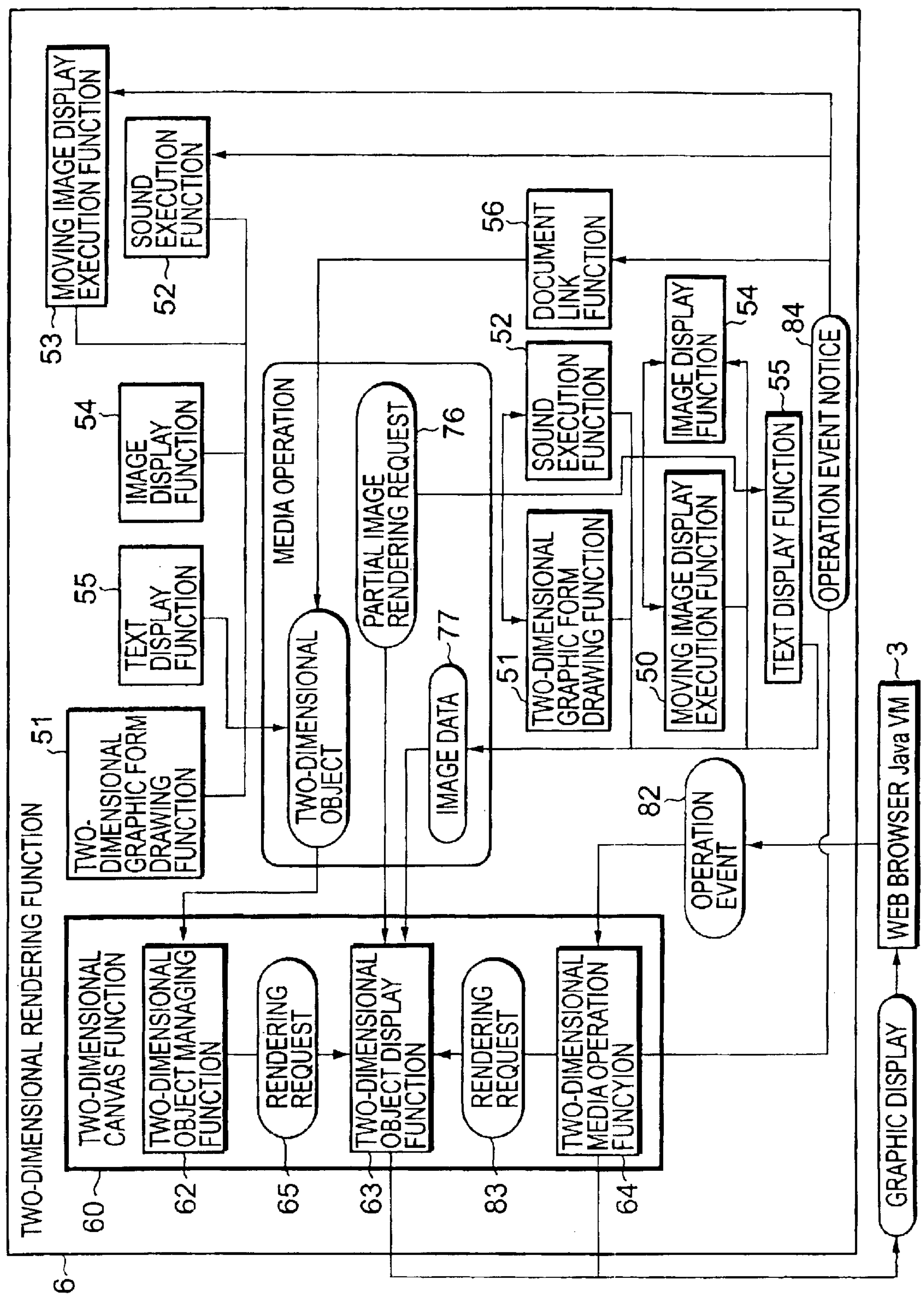
FIG. 6 is a function block diagram describing details of a two-dimensional canvas function section of the one embodiment.

In order to perform such a function, as shown in FIG. 6, this two-dimensional canvas function section 60 has a two-dimensional object managing function section 62, a two-dimensional object display function section 63 and a two-dimensional media operation function section 64.

The two-dimensional object managing function section 62 receives a two-dimensional object (media operation data) from the two-dimensional graphic form drawing function section 51, the sound execution function section 52, the moving image display execution function section 53, the image display function section 54, the text display function section 55 and the document link function section 56, and retains the two-dimensional object on memory. After receiving all two-dimensional objects, and after a transfer of a sound file, a moving image file or an image file used by each of the function sections 51–56 is completed, the two-dimensional object managing function section 62 issues a rendering request 65 (a request for generating image data for the entire two-dimensional canvas) to the aforesaid two-dimensional object display function section 63. A completion of a file transfer is determined by, for example, performing a timer monitoring.

Figure 7:
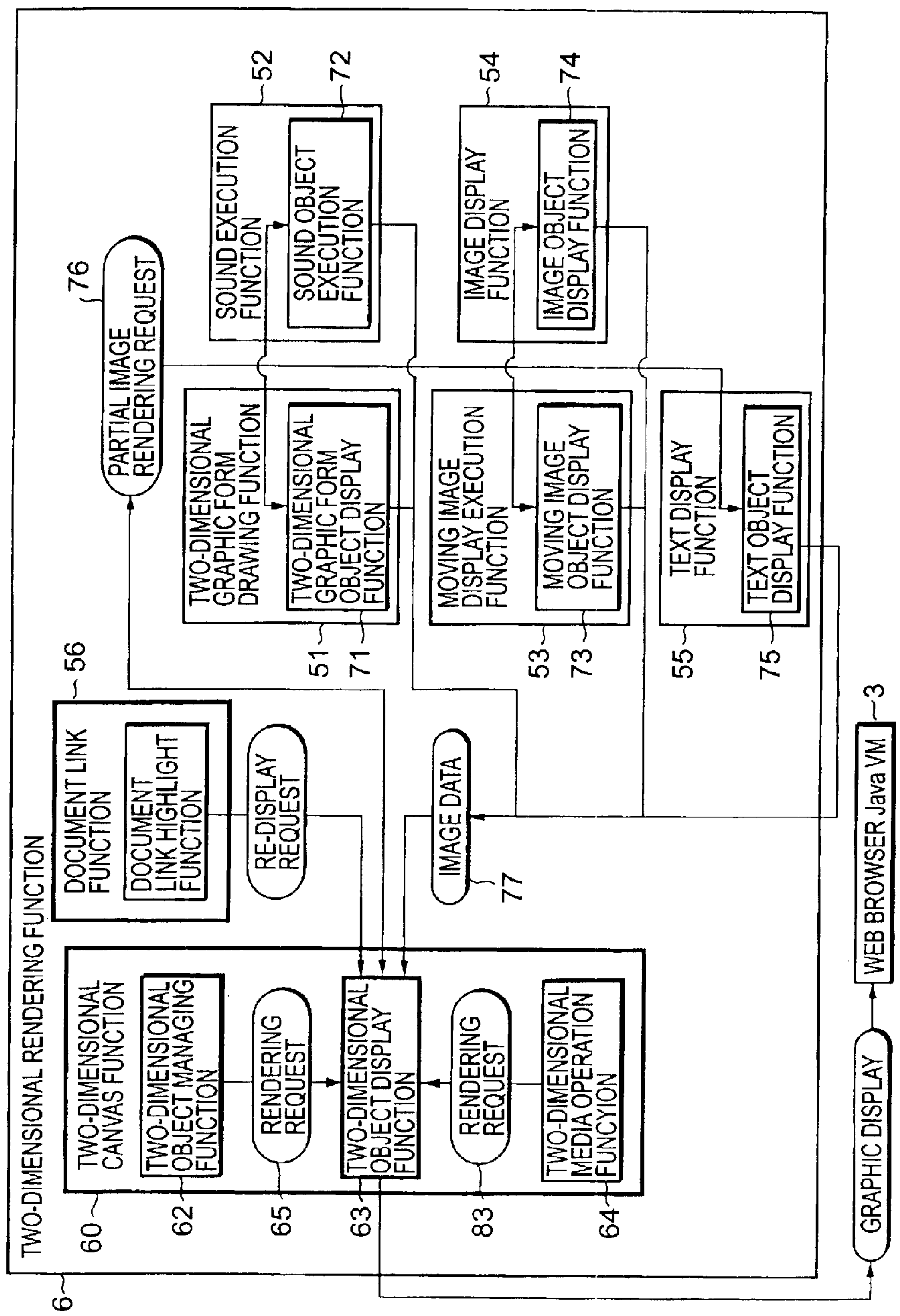
FIG. 7 is a function block diagram describing details of a two-dimensional object display function section of the one embodiment.

FIG. 7 is a function block diagram describing a behavior of the two-dimensional object display function section 63.

The aforesaid two-dimensional object display function section 63 receives a rendering request from the two-dimensional object managing function section 62 and the two-dimensional media operation function section 64, sets a two-dimensional display attribute in the canvas according to the rendering request, and passes a partial image rendering request 76 to a two-dimensional graphic form object display function section 71, a sound object execution function section 72, a moving image object display function section 73, an image object display function section 74 and a text object display function section 75 located in each of the aforesaid displaying/execution function sections 51–56.

As described above, this two-dimensional object display function section 63 receives image data 77 from each of the function sections 71–75 by passing the partial image rendering request 76 to the two-dimensional graphic form object display function section 71, the sound object execution function section 72, the moving image object display function section 73, the image object display function section 74 and the text object display function section 75. Thus, this two-dimensional object display function section 63 can combine the image data 77 drawn by each of the function sections 71–75 into image data prepared by this two-dimensional object display function section 63. The two-dimensional object display function section 63 passes this data to the Web browser 3 as graphics display data.

Also this two-dimensional canvas function section 60 receives a re-display request 80 from a document link highlight function section 79 located in the aforesaid document link function section 56 to thereby pass the created graphics display data to the Web browser 3.

Incidentally, the rendering request 65 received from the aforesaid two-dimensional media operation function section 62 may contain the following:

Zoom display specification

Rotation display specification

Pan display specification

Rectangle enlargement specification

Fit display specification

Based on the above rendering request 65, the two-dimensional display attribute set in the two-dimensional object display function section 63 comprises the following:

Zoom scale

Rotation angle

Two-dimensional coordinate system center coordinate

Actual pixel size of a display area

Also as shown in FIG. 6, the aforesaid two-dimensional media operation function section 64 located in the two-dimensional canvas function section 60 receives an operation event 82 from the Web browser 3, and performs predetermined value processing according to the operation event 82. More specifically, when performing a zoom display, a rotation display, a pan display or a fit display, the two-dimensional media operation function section 64 passes a rendering request 83 to the aforesaid two-dimensional object display function section 63. When performing an operation menu display, which is an operation-related display, and a rectangle line graphics display of rectangle enlargement, the two-dimensional media operation function section 64 performs a graphics display on the Web browser 3. When a GUI component for playing sound is clicked, the two-dimensional media operation function section 64 passes an operation event notice 84 for a GUI component to the sound execution function section 52. When a GUI component for displaying a moving image, the two-dimensional media operation function section 64 passes the operation event notice 84 to moving image display execution function section 53. When a hyperlink is clicked or the mouse moved on a hyperlink, the two-dimensional media operation function section 64 passes the operation event notice 84 to the aforesaid document link function section 56.

The following are operation menu items:

Pan display

Execute a rendering request with a pan display specification according to a mouse drag event Fit display Execute a rendering request with a fit display specification 200% zoom display Execute a rendering request with a 200% zoom specification 50% zoom display Execute a rendering request with a 50% zoom specification Rectangle enlargement display Perform a rectangle line graphics display of rectangle enlargement according to the mouse drag event, and execute a rendering request with a rectangle enlargement specification Rotation display Execute a rendering request with a rotation display specification according to the mouse drag event That is, this two-dimensional canvas function section 60 receives the operation event 82 from the Web browser 3, and converts the operation event 82 to a corresponding media operation data in order for a user to operate a graphics display. The two-dimensional graphic form drawing function section 51, the sound execution function section 52, the moving image display execution function section 53, the image display function section 54, the text display function section 55 and the document link function section 56 each provides a function for returning media operation data to the two-dimensional canvas function section 60 to display/execute a two-dimensional graphic form, sound, a moving image, an image, text or a hyperlink after the aforesaid operation.

Also this two-dimensional canvas function section 60 has a function for calculating a transformation of a two-dimensional canvas, and creating operation data including a drawing procedure for a display on a three-dimensional canvas if the two-dimensional canvas is pasted on the three-dimensional canvas.

(Three-dimensional Rendering Function Section)

Next, the three-dimensional rendering function section 7 will be described.

Figure 8:
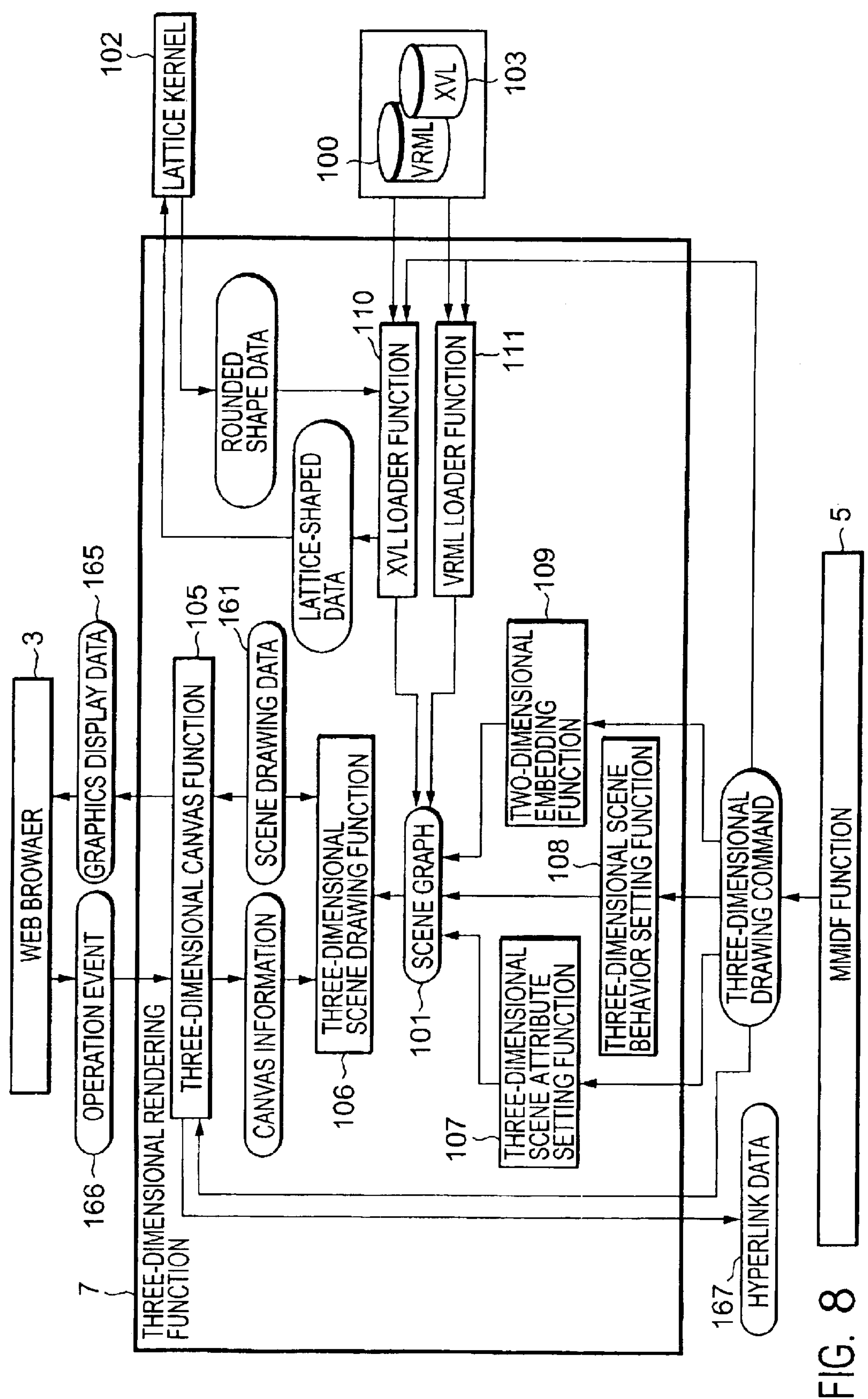
FIG. 8 is a function block diagram describing details of a three-dimensional rendering function section of the one embodiment.

FIG. 8 is a function block diagram describing details of only this three-dimensional rendering function section 7.

The three-dimensional rendering function section 7 is activated by the Web browser 3 and downloaded as an object from the Web server 10 to the client personal computer 2 for execution.

In general, in order to draw a three-dimensional scene, a graphics library such as OpenGL is used. However, it is inappropriate to use the graphics library from an application which is executed on the Web browser 3 as an applet since a native call to a system of the client personal computer 2 is used in such a case to thereby compromise a security.

Currently, a two-dimensional drawing command of Java AWT prepared as a Java applet is the only drawing command capable of a graphics display on the Web browser 3 without unnecessary installation on the client personal computer 2. Therefore, this three-dimensional rendering function section 7 is structured to internally process a mechanism of a three-dimensional graphics pipeline as shown in FIG. 9, and call an API of Java AWT for a final drawing command.

Figure 9:
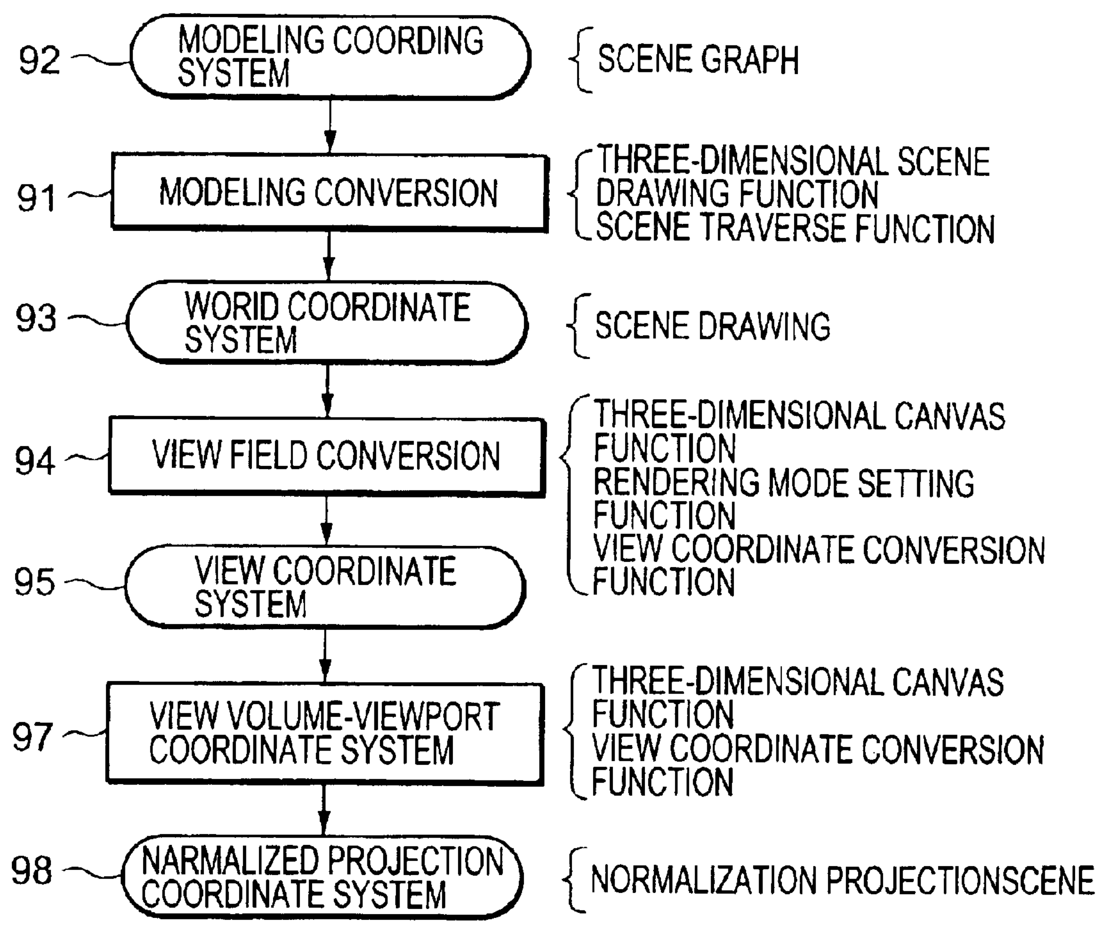
FIG. 9 is a flowchart showing a processing process of a three-dimensional graphics pipeline of the one embodiment.

In FIG. 9, modeling conversion 91 converts coordinate system data which defines a shape of a body (a modeling coordinate system 92) to coordinate system data of a space where the body is located (a world coordinate system 93).

A view field conversion 94 sets a projection plane for an actual display and converts the world coordinate system 93 to view field coordinate system data projected on the projection plane (a view coordinate system 95). Moreover, the view field conversion 94 performs a color setting for shading using a normal line of the projection plane and a light source. Also the view field conversion 94 excludes non-view volume data from a display object list.

A view volume-viewport conversion 97 converts a view volume in a view field coordinate system to a viewport in a normalized projection coordinate system 98. The normalized projection coordinate system 98 is a coordinate system where the maximum cubic expressed with an X-Y-Z coordinate in a screen coordinate system (a device coordinate system) is normalized to $[0,1]\times[0,1]\times[0,1]$, and considered for parallel projection or perspective projection as well a during coordinate conversion.

As shown in FIG. 8, on receipt of the three-dimensional drawing command from the aforesaid MMIDF function section 5, the three-dimensional rendering function section 7 downloads a VRML file 100 located on the Web server 10 to the client personal computer 2, and then reads a content of the VRML file 100 and construct a scene graph 101 for a three-dimensional display. Alternatively, the three-dimensional rendering function section 7 downloads an XVL file 103 located on the Web server 10 to the client personal computer 2, and then obtains lattice data by interpreting a content of the XVL file 103, passes the lattice data to a "Lattice kernel" 102, receives rounded shape data calculated and generated from the lattice data in the "Lattice kernel" 102 and constructs the scene graph 101 for a three-dimensional display.

Furthermore, the three-dimensional rendering function section 7 receives a three-dimensional drawing command, which indicates an attribute of a three-dimensional scene, a behavior of the three-dimensional scene, or setting a content for mapping from a two-dimensional image to a three-dimensional plane, from the aforesaid MMIDF function section 5, performs an addition, a deletion or a change for a scene graph tree, which comprises an internally retained accumulation of the scene graph 101, for a three-dimensional graphics display, traverses the scene graph tree, generates graphics display data for expressing a drawing in three dimensions with a command set for a final two-dimensional drawing of Java AWT, and passes the graphics display data to the API of Java AWT provided by the Web browser 3. A setting value is calculated by traversing the scene graph tree and generating world coordinate system data using a three-dimensional modeling coordinate system conversion, a view field coordinate system conversion, a normalized projection coordinate system conversion, and a hidden surface control by a Z-buffer method.

Also this three-dimensional rendering function section 7 receives an operation event which indicates a content of a mouse operation and a keyboard input of the user, performs viewpoint operation processing of the scene graph tree, and thereby re-displays a three-dimensional image according to a changed viewpoint using the aforesaid processing so that the user can operate on a three-dimensional space pasted on the Web browser 3.

Also the three-dimensional rendering function section 7 performs picking processing for two-dimensional data mapped to a three-dimensional shape from the received operation event, and passes hyperlink information which enables a jump to a linked location to the MMIDF function section 5 if the picking is a three-dimensional shape which has a hyperlink setting as an attribute.

As shown in FIG. 8, in order to perform the above functions, the three-dimensional rendering function section 7 has a three-dimensional canvas function section 105, a three-dimensional scene drawing function section 106, a three-dimensional scene attribute setting function section 107, a three-dimensional scene behavior setting function section 108, a two-dimensional embedding function section 109, an XVL loader function section 110 and an VRML loader function section 111.

In the following, a structure and a behavior of each function section will be described according to data stream.

First, as stated previously, a three-dimensional drawing command which enters the three-dimensional rendering function section 7 (shown as 112 in FIG. 8) is generated in the three-dimensional drawing command generation function section 30 located in the MMDSAX manager function section 22 of the aforesaid MMIDF function section 5 (refer to FIG. 3). This three-dimensional drawing command generation function section 30 receives document data which indicates a three-dimensional canvas, a three-dimensional scene attribute, a three-dimensional scene behavior, two-dimensional embedding data, an XVL loader or a VRML loader, obtained by the syntax analysis of the XML document the CMW function section 27 or the TVX function section 26 in the aforesaid document callback function section 16, interprets a content of the document data, and generates a three-dimensional drawing command. Then, as shown in FIG. 8, the three-dimensional drawing command generation function section 30 sends this three-dimensional drawing command 112 as an output to a respective function in the three-dimensional canvas function section 105, the three-dimensional scene attribute setting function section 107, the three-dimensional scene behavior setting function section 108, the two-dimensional embedding function section 109, the XML loader function section 110 and the VRML loader function section 111 according to a content of the three-dimensional drawing command.

Figure 22:
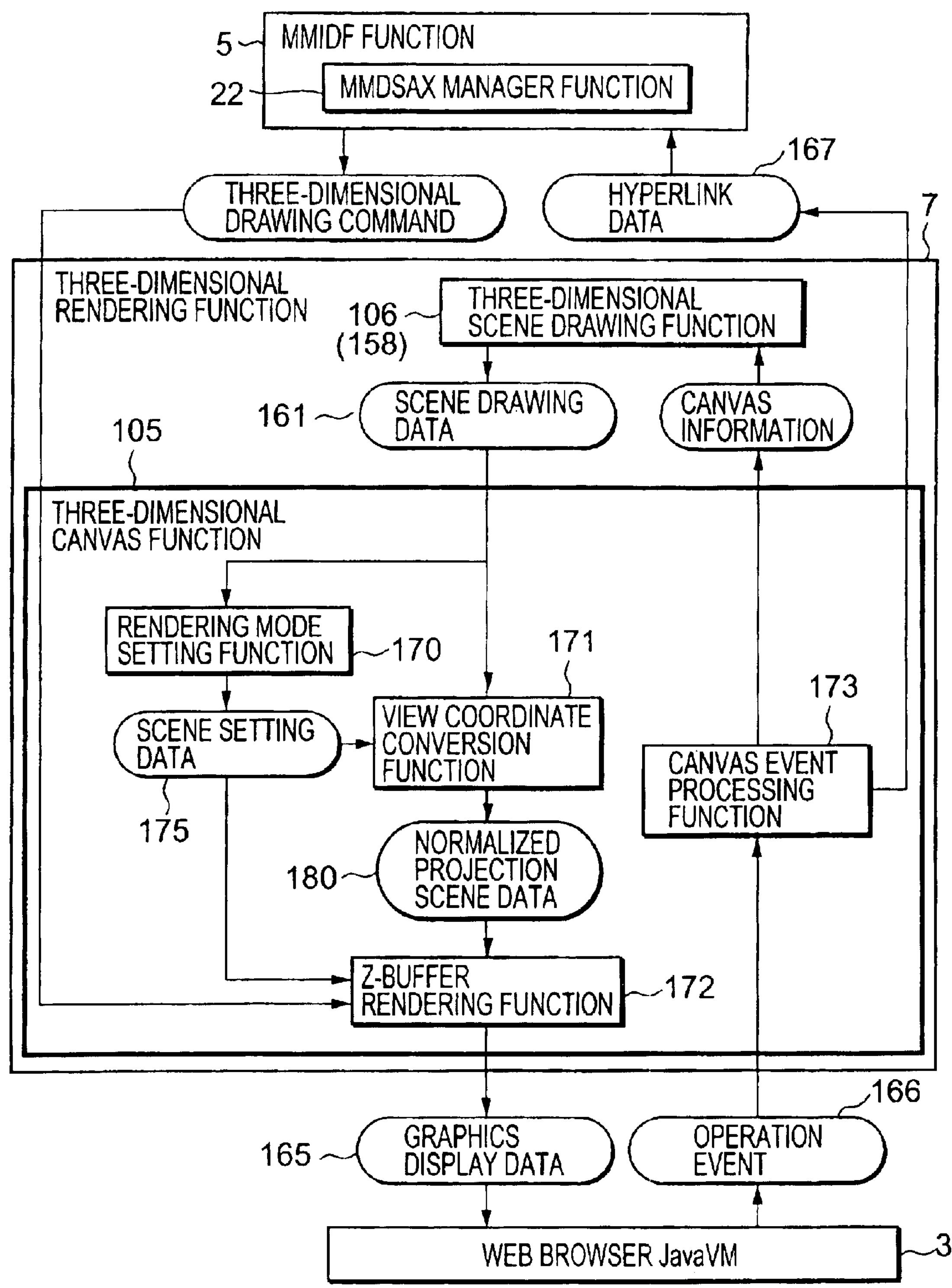
FIG. 22 is a function block diagram describing details of a three-dimensional canvas function section of the one embodiment.

More specifically, if the aforesaid document data 19 indicates a three-dimensional rendering area, the three-dimensional drawing command generation function section 30 generates three-dimensional drawing command data indicating a content of a three-dimensional canvas area setting, and passes the three-dimensional drawing command data to a Z-buffer rendering function section in the three-dimensional canvas function section 105 (shown as 172 in FIG. 22).

Figure 10:
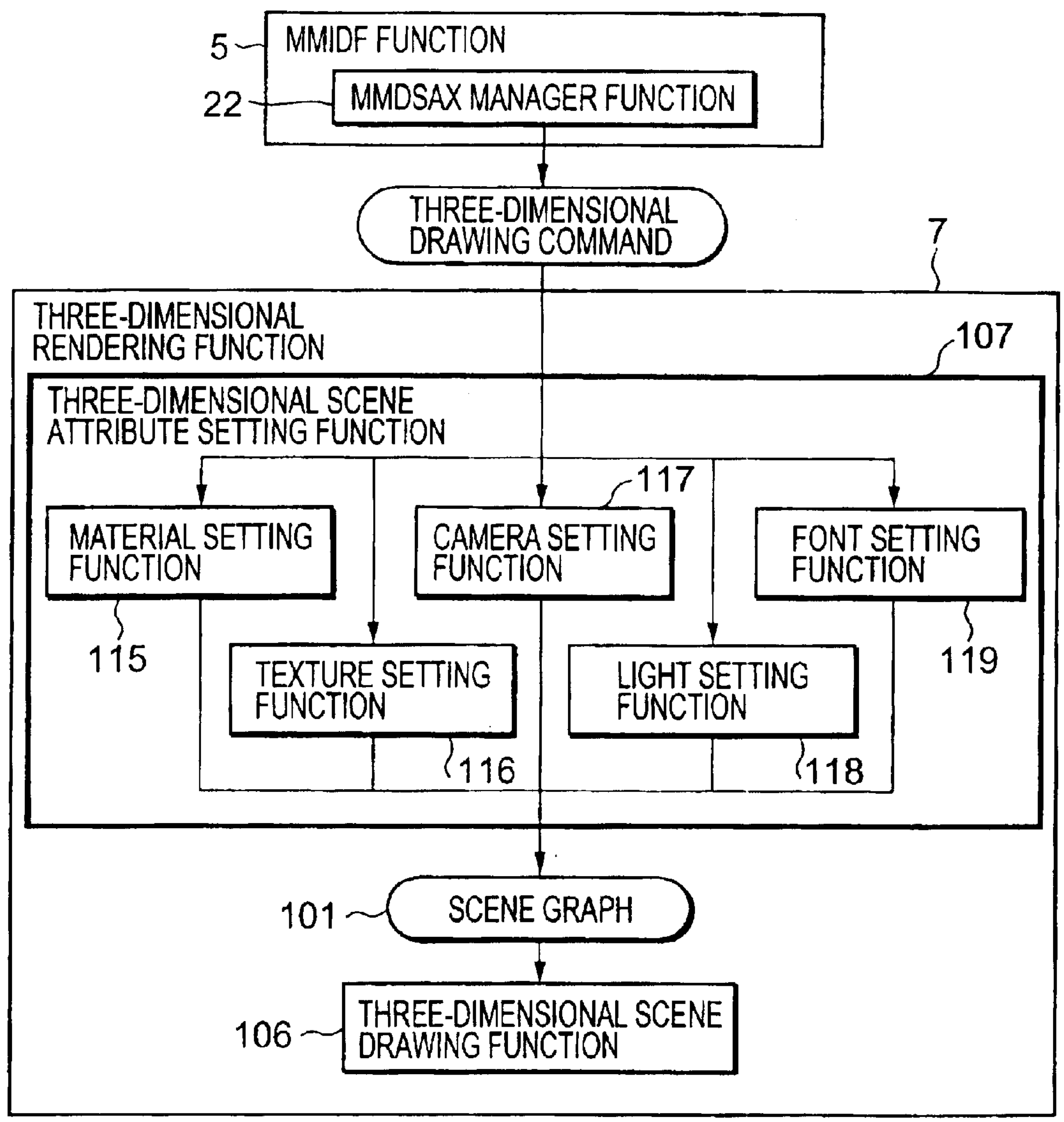
FIG. 10 is a function block diagram describing details of a three-dimensional scene attribute setting function section of the one embodiment.

If the document data 19 is material data, the three-dimensional drawing command generation function section 30 generates three-dimensional drawing command data indicating a content of a material setting with a three-dimensional scene attribute and passes the three-dimensional drawing command data to a material setting function section in the three-dimensional scene attribute setting function section 107 (shown as 115 in FIG. 10).

If the document data 19 is texture data, the three-dimensional drawing command generation function section 30 generates three-dimensional drawing command data indicating a content of a texture setting with a three-dimensional scene attribute and passes the three-dimensional drawing command data to a texture setting function section in the three-dimensional scene attribute setting function section 107 (shown as 116 in FIG. 10).

If the document data 19 is camera data, the three-dimensional drawing command generation function section 30 generates three-dimensional drawing command data indicating a content of a camera setting with a three-dimensional scene attribute and passes the three-dimensional drawing command data to a camera setting function section in the three-dimensional scene attribute setting function section 107 (shown as 117 in FIG. 10).

If the document data 19 is light data, the three-dimensional drawing command generation function section 30 generates three-dimensional drawing command data indicating a content of a light setting with a three-dimensional scene attribute and passes the three-dimensional drawing command data to a light setting function section in the three-dimensional scene attribute setting function section 107 (shown as 118 in FIG. 10).

If the document data 19 is font data, the three-dimensional drawing command generation function section 30 generates three-dimensional drawing command data indicating a content of a font setting with a three-dimensional scene attribute and passes the three-dimensional drawing command data to a font setting function section in the three-dimensional scene attribute setting function section 107 (shown as 119 in FIG. 10).

Figure 11:
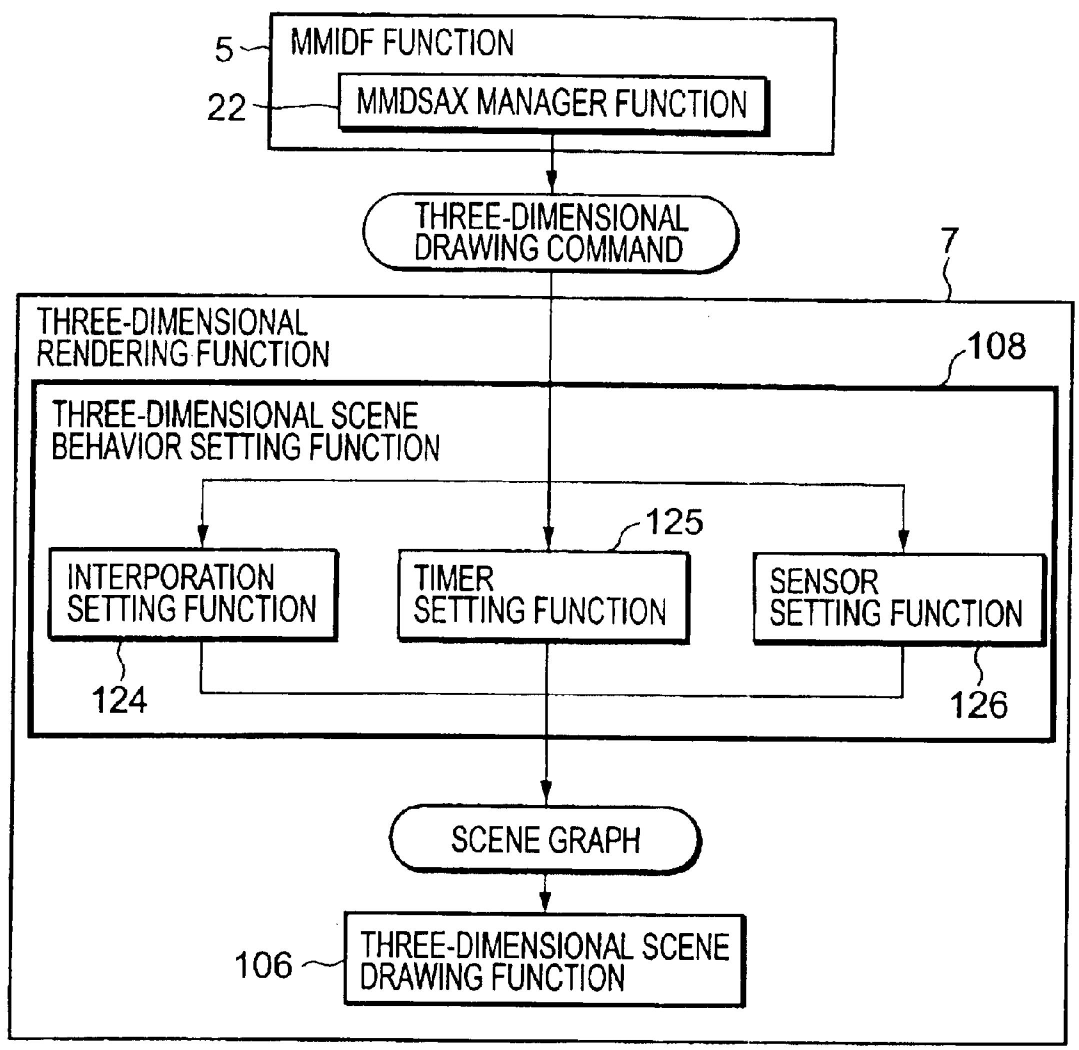
FIG. 11 is a function block diagram describing details of a three-dimensional scene behavior function section of the one embodiment.

If the document data 19 is interpolation data, the three-dimensional drawing command generation function section 30 generates three-dimensional drawing command data indicating a content of a interpolation setting with a three-dimensional scene behavior and passes the three-dimensional drawing command data to an interpolation setting function section in the three-dimensional scene behavior setting function section 108 (shown as 124 in FIG. 11).

If the document data 19 is timer data, the three-dimensional drawing command generation function section 30 generates three-dimensional drawing command data indicating a content of a timer setting with a three-dimensional scene behavior and passes the three-dimensional drawing command data to a timer setting function section in the three-dimensional scene behavior setting function section 108 (shown as 125 in FIG. 11).

If the document data 19 is sensor data, the three-dimensional drawing command generation function section 30 generates three-dimensional drawing command data indicating a content of a sensor setting with a three-dimensional scene behavior and passes the three-dimensional drawing command data to a sensor setting function section in the three-dimensional scene behavior setting function section 108 (shown as 126 in FIG. 11).

Figure 13:
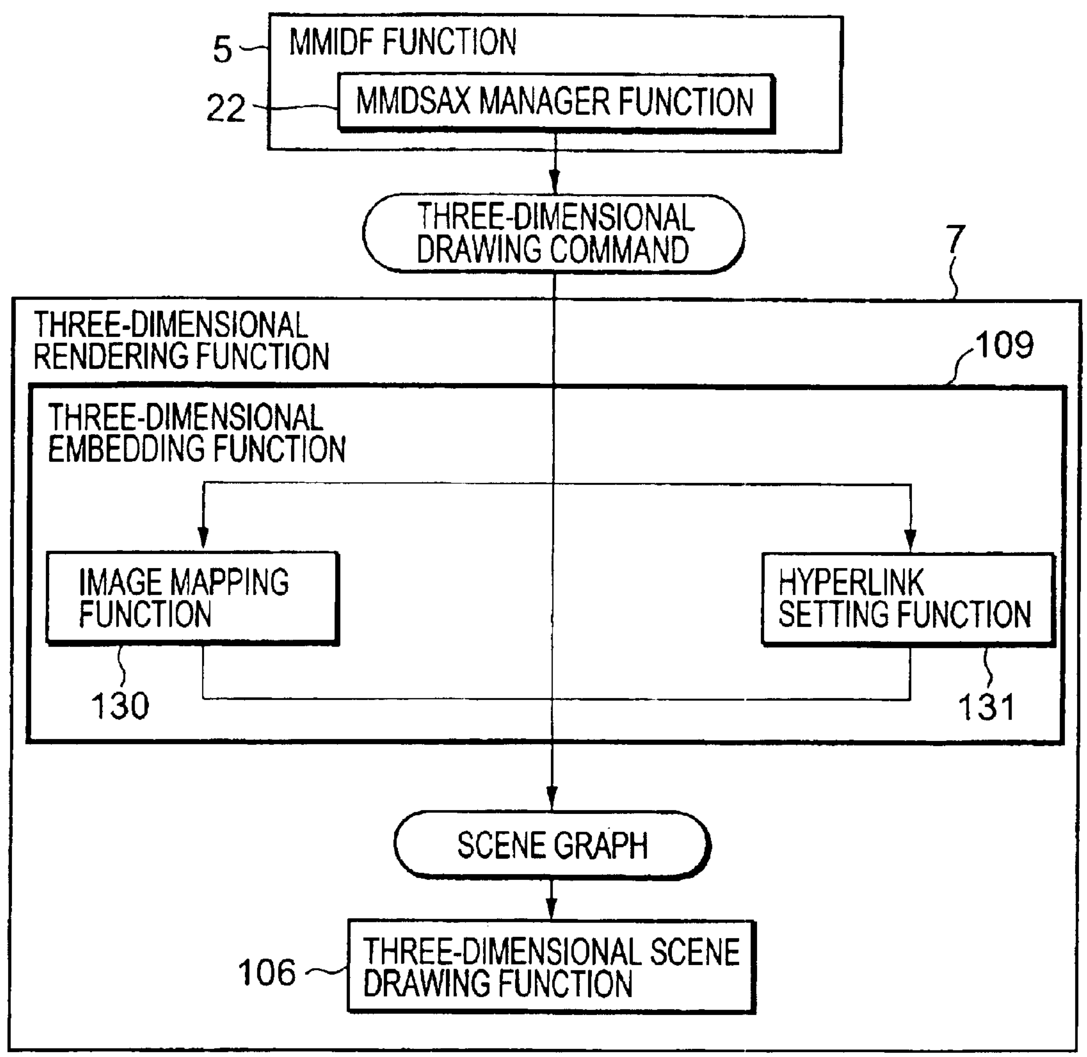
FIG. 13 is a function block diagram describing details of a two-dimensional embedding function section of the one embodiment.

If the document data 19 is image mapping data, the three-dimensional drawing command generation function section 30 generates three-dimensional drawing command data indicating a content of image mapping for two-dimensional embedding and passes the three-dimensional drawing command data to an image mapping function section in the two-dimensional embedding function section 109 (shown as 130 in FIG. 13).

If the document data 19 is hyperlink data, the three-dimensional drawing command generation function section 30 generates three-dimensional drawing command data indicating a content of hyperlink for two-dimensional embedding and passes the three-dimensional drawing command data to a hyperlink setting function section in the two-dimensional embedding function section 109 (shown as 131 in FIG. 13).

Figure 14:
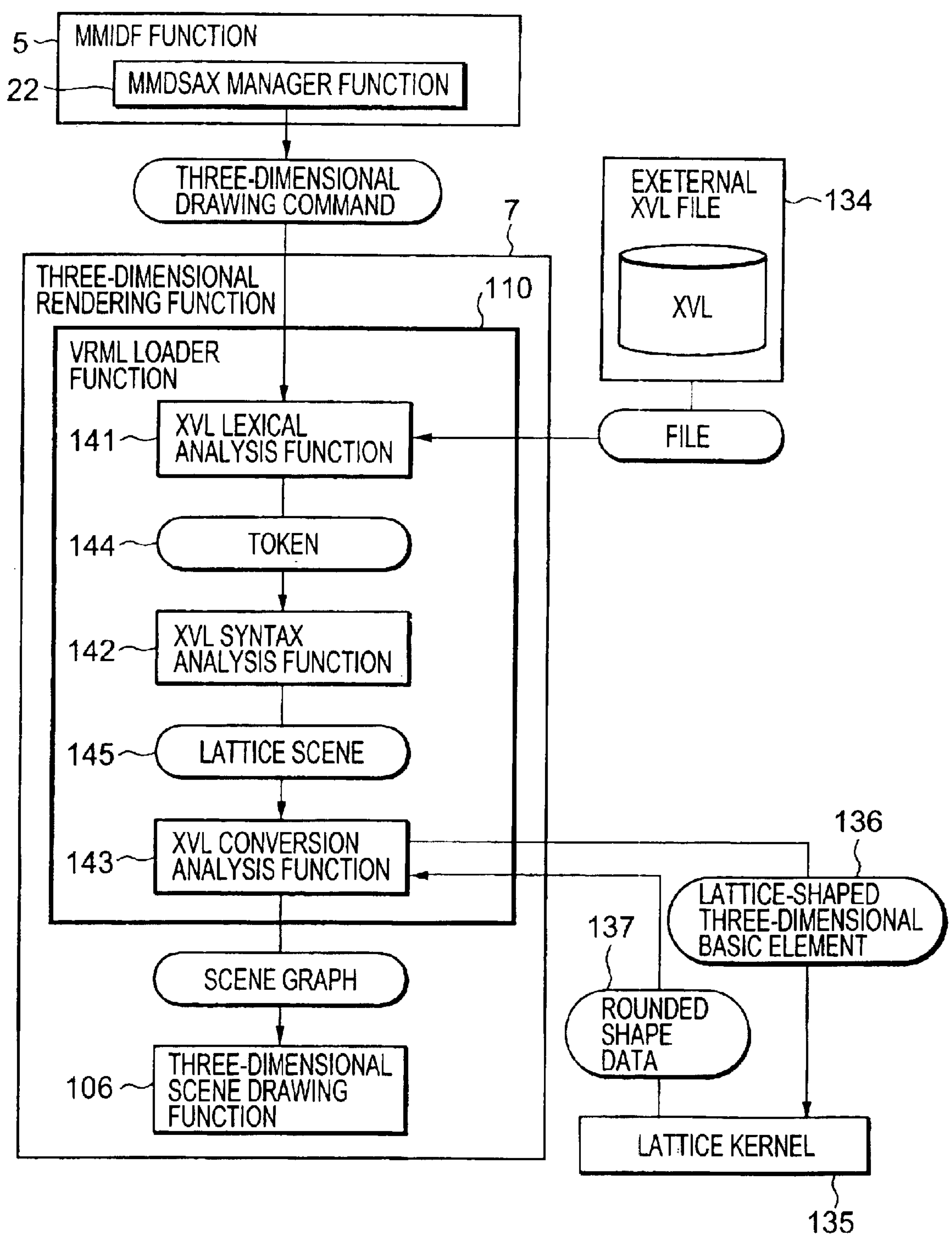
FIG. 14 is a function block diagram describing details of an XVL loader function section of the one embodiment.

If the document data 19 is XVL loading, the three-dimensional drawing command generation function section 30 generates three-dimensional drawing command data indicating contents of a file name and a file location and passes the three-dimensional drawing command data to an XVL lexical analysis function section in the XML loader function section 110 (shown as 141 in FIG. 14).

Figure 18:
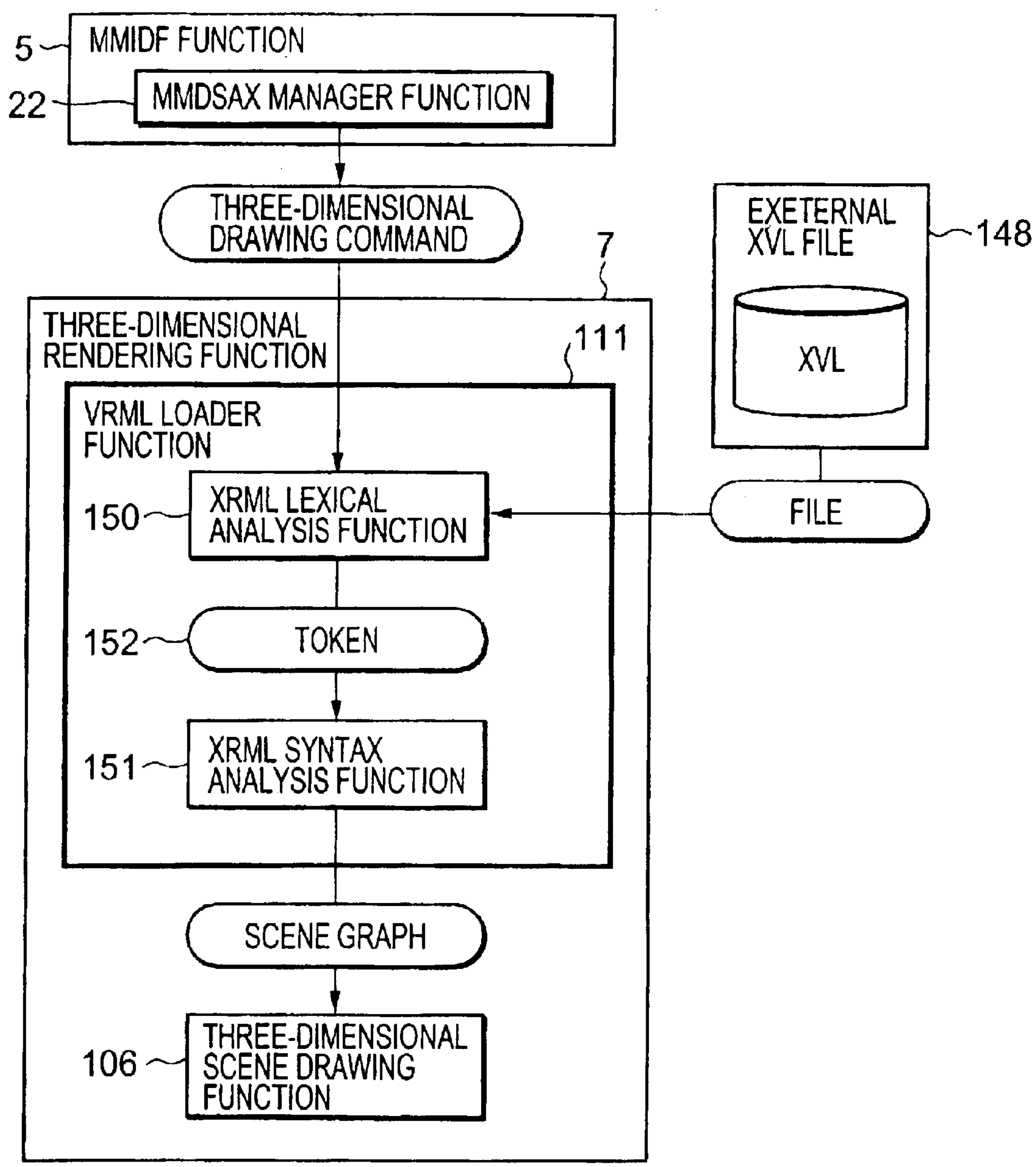
FIG. 18 is a function block diagram describing details of a VRML loader function section of the one embodiment.

If the document data 19 is VRML loading, the three-dimensional drawing command generation function section 30 generates three-dimensional drawing command data indicating contents of a file name and a file location for VRML loading and passes the three-dimensional drawing command data to a VRML lexical analysis function section in the VRML loader function section 111 (shown as 150 in FIG. 18).

In the following, each behavior of the aforesaid components 107–111 based on the aforesaid three-dimensional drawing command will be individually described.

FIG. 10 is a function block diagram describing a behavior of the three-dimensional scene attribute setting function section 107.

This three-dimensional scene attribute setting function section 107 becomes activated by a three-dimensional drawing command (the three-dimensional scene attribute setting command) from the aforesaid MMDSAX manager function section 22 (the three-dimensional drawing command generation function section 30), and provides a function for setting or changing three-dimensional attributes, including camera, light, model color, font style, coordinate system, image texture, material, normal, texture coordinate system, texture transformation, hyperlink in the "scene graph" 101. Also, the three-dimensional scene attribute setting function section 107 has another function for generating a scene graph 101 with a three-dimensional attribute setting, and passing the scene graph 101 to the aforesaid three-dimensional scene drawing function section 106 to reflect a change of the three-dimensional attributes in the three-dimensional space.

Here, as described in detail later, a scene graph is data for a data structure of a non-cyclic graph composed of a tree-shaped structure of nodes, and defined as an API in the above function.

As shown in this FIG. 10, in order to perform the above function, this three-dimensional scene attribute setting function section 107 has the material setting function section 115, the texture setting function section 116, the camera setting function section 117, the light setting function section 118 and the font setting function section 119.

The material setting function section 115 has a function for receiving three-dimensional drawing command data for a material setting from the three-dimensional drawing command generation function section 30, generating a scene graph according to the three-dimensional drawing command, and passing the scene graph to the aforesaid three-dimensional scene drawing function section 106 (a scene graph construction function section) in order to set material data in the scene graph tree retained in the aforesaid three-dimensional scene drawing function section 106 (the scene graph construction function section).

Here, a "material" specifies a surficial material property to geometry of an associated scene graph and is used together with lighting for an illumination calculation during a rendering.

The material setting function section 115 sets material field shown below:

DiffuseColor: Reflects all light sources based on an angle of a surface with respect to the light source. The closer the angle is to 90 degrees, the more diffuse light reflects.

AmbientIntensity: Specifies an amount of reflection by the above surface for an ambient light from the light source. The ambient light is directed to all directions and affected by the number of the light sources, but not by light source locations with respect to the surface. An ambient color is defined as DiffuseColor*AmbientIntensity.

SpecularColor: Specifies a specular highlight such as a shiny spot on an apple. When the angle from the light to the surface is close to the angle from the surface to the viewer, the SpecularColor is added to the diffuse and ambient color calculations.

Shininess: Specifies sharpness of a light concomitantly with a SpecularColor setting. Lower shininess values produce soft glows, while higher values result in sharper, smaller highlights.

EmissiveColor: Specifies a glowing object.

Transparency: Specifies fraction of a light transmitted through an object, with 1.0 being completely transparent, and 0.0 completely opaque.

Also the texture setting function section 116 has a function for generating three-dimensional drawing command data for a texture setting from the aforesaid three-dimensional drawing command generation function section 30, generating a scene graph according to the three-dimensional drawing command, and passing the scene graph to the three-dimensional scene drawing function section 106 (the scene graph construction function section) in order to set texture data in the scene graph tree retained in the aforesaid three-dimensional scene drawing function section 106 (the scene graph construction function section).

A texture in this function defines texture mapping by specifying a parameter for mapping to an image and geometry. More specifically, a texture map is defined in a two-dimensional coordinate system in both directions of the image in a rage 0.0–1.0. Regardless of an image size, the lower left corner and the upper right corner of the image correspond to 0.0 and 0.0, respectively. Also the texture map is continuously joined and mapped even if a parameter to be mapped to the geometry exceeds the range 0.0–1.0, by repeating mapping calculations infinitely in all directions.

Also the camera setting function section 117 has a function for receiving three-dimensional drawing command data which indicates contents of a viewpoint and a line of sight for a camera setting from the three-dimensional drawing command generation function section 30, generating a scene graph according to the three-dimensional drawing command, and passing the scene graph to the three-dimensional scene drawing function section 106 (the scene graph construction function section) in order to set camera data in the scene graph tree retained in the three-dimensional scene drawing function section 106 (the scene graph construction function section).

This camera setting function section 117 sets a specific location for the view field coordinate system, in which the user views the scene with respect to a camera. The camera defines a parameter of the view field conversion 94 in the aforesaid three-dimensional graphics pipeline (FIG. 9). If no camera setting is received as a three-dimensional drawing command from the three-dimensional drawing command generation function section 30, a default value is set and passed as a scene graph to the three-dimensional scene drawing function section 106 (the scene graph construction function section).

Camera information comprises a camera position, a camera orientation and a FOV (field of view), which define a viewpoint origin, a line of sight direction, and a view field, respectively.

In a view control of a screen, a scene graph parameter of the camera is changed based on the camera information defined here.

The aforesaid light setting function section 118 has a function for receiving three-dimensional drawing command data for a light setting form the three-dimensional drawing command generation function section 30, generating a scene graph according to the three-dimensional drawing command according to the three-dimensional drawing command, and passing the scene graph to the three-dimensional scene drawing function section 106 (the scene graph construction function section) in order to set light source data in the scene graph tree retained in the three-dimensional scene drawing function section 106 (the scene graph construction function section).

A light in the aforesaid light setting function section 118 defines a three-dimensional vector and illuminates along a line parallel to the three-dimensional vector as a directional light source.

The light defined in this light setting function section 118 retains the following parameters:

Intensity: Specifies brightness of a direct illumination from the light source.

Color: Specifies a color spectrum characteristic of the light.

AmbientIntensity: Specifies brightness of ambient radiation from the light source.

The geometry is illuminated by this light and colored by an illumination calculation using light diffusion and reflection from a direct illumination from the light source.

Furthermore, the aforesaid font setting function section 119 has a function for receiving three-dimensional drawing command data for a font setting from the three-dimensional drawing command generation function section 30, generating a scene graph according to three-dimensional drawing command, and passing the scene graph to the three-dimensional scene drawing function section 106 (the scene graph construction function section) in order to set font data in the scene graph tree retained in the three-dimensional scene drawing function section 106 (the scene graph construction function section).

Also a font setting in this font setting function section 119 defines a font size of text and a font style, which indicates PLAIN, BOLD or ITALIC. An actual size and style of text expressed in the three-dimensional space are confirmed according to contents of the font setting, and a three-dimensional rendering is performed to the text. PLAIN in the font style is a standard style and this is an initial setting. BOLD and ITALIC specify a bold style and an italic style, respectively.

Next, the aforesaid three-dimensional scene behavior function section 108 will be described in accordance with FIG. 11.

This three-dimensional scene behavior function section 108 has a function for receiving three-dimensional drawing command data from the MMDSAX manager function section 22, setting a behavior in the three-dimensional scene, generating a scene graph of a three-dimensional scene behavior setting, and passing the scene graph to the three-dimensional scene drawing function section 106 in order to express a moving image animation from part of the scene or the entire scene according to a time, an event and/or the like.

Figure 12:
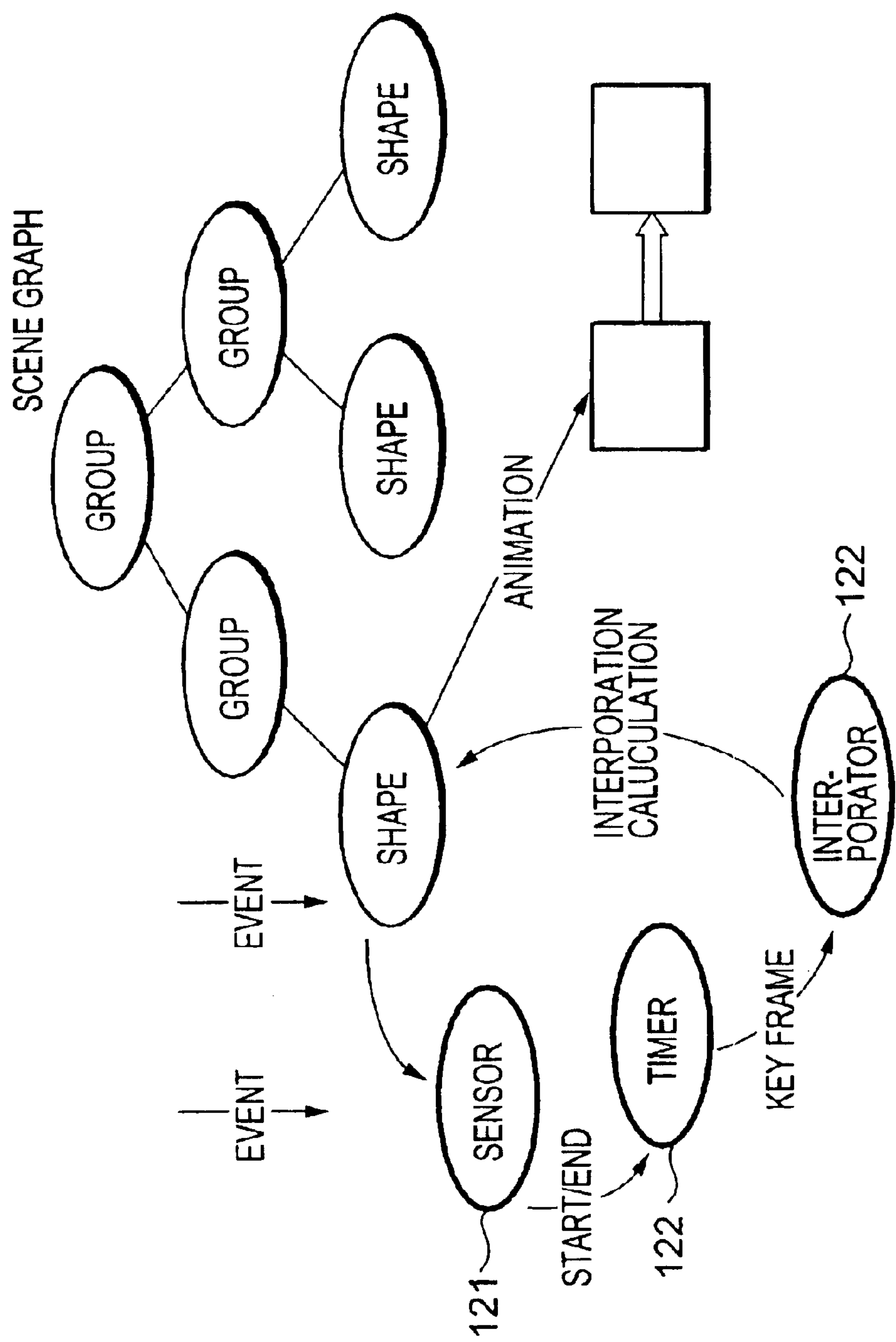
FIG. 12 is a conceptual diagram describing details of a three-dimensional scene behavior setting function of the one embodiment.

In other words, a function of this three-dimensional scene behavior function section 108 is to realize an animation using a key frame and define, in order, a sensor 121, a timer 122 and an interpolation 123 for a behavior according to a three-dimensional behavior flow such as one shown in FIG. 12. In FIG. 12, the sensor 121 waits for a timing to start a key frame animation and, concomitantly with a start of the sensor 121, a timing of the key frame is created by the timer 122, which manages a passage of time. The interpolation 123 is performed by automatically calculating a value according to the key frame by an interpolation between discrete parameters in a movement, and thereby animation is realized according to the passage of time.

In other words, this three-dimensional scene behavior function section 108 receives information for setting the parameters from the aforesaid MMDSAX manager function section 22 as a three-dimensional drawing command, and generates the scene graph.

As shown in FIG. 11, this three-dimensional scene behavior function section 108 has the interpolation setting function section 124, the timer setting function section 125 and a sensor setting function section 126 in order to realize the above function.

The interpolation setting function section 124 has a function for receiving three-dimensional drawing command data for an interpolation setting from the three-dimensional drawing command generation function section 30, generates a scene graph according to a three-dimensional drawing command, and passing the scene graph to the three-dimensional scene drawing function section 106 (the scene graph construction function section) in order to set interpolation data in the scene graph tree retained in the three-dimensional scene drawing function section 106 (the scene graph construction function section).

An interpolation is a node for generating a value within a predetermined range by an interpolation calculation if numeric values is given to determine the range. This interpolation setting function section 108 sets a key and a corresponding key value as sufficient information before calculating this interpolation. That is, the key and the corresponding key value are used as reference values when an arbitrary interpolation value is calculated.

Interpolations provided by this system are PositionInterpolator and OrientationInterpolator for performing an interpolation between coordinate values and an interpolation of a rotation, respectively.

More specifically, when a character with movement data is read in the aforesaid MMIDF function section 5, the aforesaid three-dimensional drawing command generation function section 30 generates a three-dimensional drawing command as a behavior setting and passes the three-dimensional drawing command to the interpolation function section 124. This interpolation function section 124 generates a scene graph of an interpolation of PositionInterpolator or OrientationInterpolator according to a content of the three-dimensional drawing command, and passes the scene graph to the three-dimensional scene drawing function section 106 (the scene graph construction function section).

Also PositionInterpolator realizes an interpolation of a location, and it is required to set data representing a plurality of locations for a desired movement for one key. OrientationInterpolator realizes an interpolation of a rotation, and it is required to set data representing a plurality of rotation for a desired rotation for one key.

Concomitantly, the aforesaid timer setting function section 125 receives three-dimensional drawing command data for a timer setting from the three-dimensional drawing command generation function section 30, generates a scene graph according to a three-dimensional drawing command and passes the scene graph to the three-dimensional scene drawing function section 106 (the scene graph construction function section) in order to set timer data in the scene graph tree retained in the aforesaid three-dimensional scene drawing function section 106 (the scene graph construction function section).

It is required to activate a scene graph of an interpolation in order to realize a behavior, and it is required to pass a key to an interpolation in order to generate a coordinate value and the like. A timer is a scene graph for passing a key to the interpolation according to a time series.

The timer retains the following fields:

CycleInterval: Specifies a cycle (a period) for iteration.

Loop: Specifies whether or not the iteration is performed.

Fraction: Specifies the fraction of time passed within one cycle. This value is passed as an interpolation key.

Also the aforesaid sensor setting function section 126, three-dimensional drawing command data for a sensor setting from the aforesaid three-dimensional drawing command generation function section 30, generates a scene graph according to a three-dimensional drawing command and passes the scene graph to the three-dimensional scene drawing function section 106 (the scene graph construction function section) in order to set sensor data in the scene graph tree retained in the three-dimensional scene drawing function section 106 (the scene graph construction function section).

This system provides TouchSensor (touch: picking by the mouse on screen) as a sensor, and this function generates a scene graph of this TouchSensor and passes the scene graph to the three-dimensional scene drawing function section 106 (the scene graph construction function section). TouchSensor retains the following fields and the sensor setting function section 126 generates a scene graph for setting these values.

Node: Specifies geometry of a scene graph subject to a touch.

Timer: Specifies a timer for starting to add time series increments when touched.

Next, the aforesaid two-dimensional embedding function section 109 will be described in accordance with FIG. 13.

The aforesaid two-dimensional embedding function section 109 has a function for receiving three-dimensional drawing command data for embedding two-dimensional image data from the MMDSAX manager function section 22, generating a scene graph for embedding the two-dimensional image data to a scene graph tree of a three-dimensional screen displayed and passing the scene graph to the three-dimensional scene drawing function section 106.

Also if a hyperlink is set to a two-dimensional image to be embedded, the two-dimensional embedding function section 109 receives hyperlink information as a three-dimensional drawing command as well as the two-dimensional image data, generates a scene graph for embedding two-dimensional data with the hyperlink information and passes the scene graph to the three-dimensional scene drawing function section 106. Thereby, if geometry is selected with two-dimensional image data pasted therein, a jump to a specified link location becomes possible by picking a three-dimensional space.

To perform the above function, as shown in FIG. 13, this two-dimensional embedding function section 109 has an image mapping function section 130 and a hyperlink setting function section 131.

The image mapping function section 130 receives three-dimensional drawing command data for an image mapping setting from the three-dimensional drawing command generation function section 30, generates a scene graph according to a three-dimensional drawing command and passes the scene graph to the three-dimensional scene drawing function section 106 (the scene graph construction function section) in order to set a texture for image mapping in the scene graph tree retained in the three-dimensional scene drawing function section 106 (the scene graph construction function section).

The aforesaid hyperlink setting function section 131 has a function for receiving three-dimensional drawing command data for hyperlink setting from the three-dimensional drawing command generation function section 30, generating a scene graph according to three-dimensional drawing command and passing the scene graph to the three-dimensional scene drawing function section 106 (the scene graph construction function section) in order to set a hyperlink in the scene graph tree retained in the three-dimensional scene drawing function section 106 (the scene graph construction function section).

Next, the XVL loader function section 110 will be described in accordance with FIG. 14.

The XVL loader function section 110 is activated by a three-dimensional drawing command (XVL file request) from the MMDSAX manager function section 22. This XML loader function section 110 reads an external "XVL" file 134, retrieves a lattice-shaped three-dimensional basic element 136 and converts it to a rounded shape data 137 using a "Lattice kernel" 135, and generates a scene graph. The generated scene graph is passed to the three-dimensional scene drawing function section 106.

An XVL file format includes information for generating shape data using the Lattice kernel 135 within a stipulated range of a VRML file format.

Figure 15:
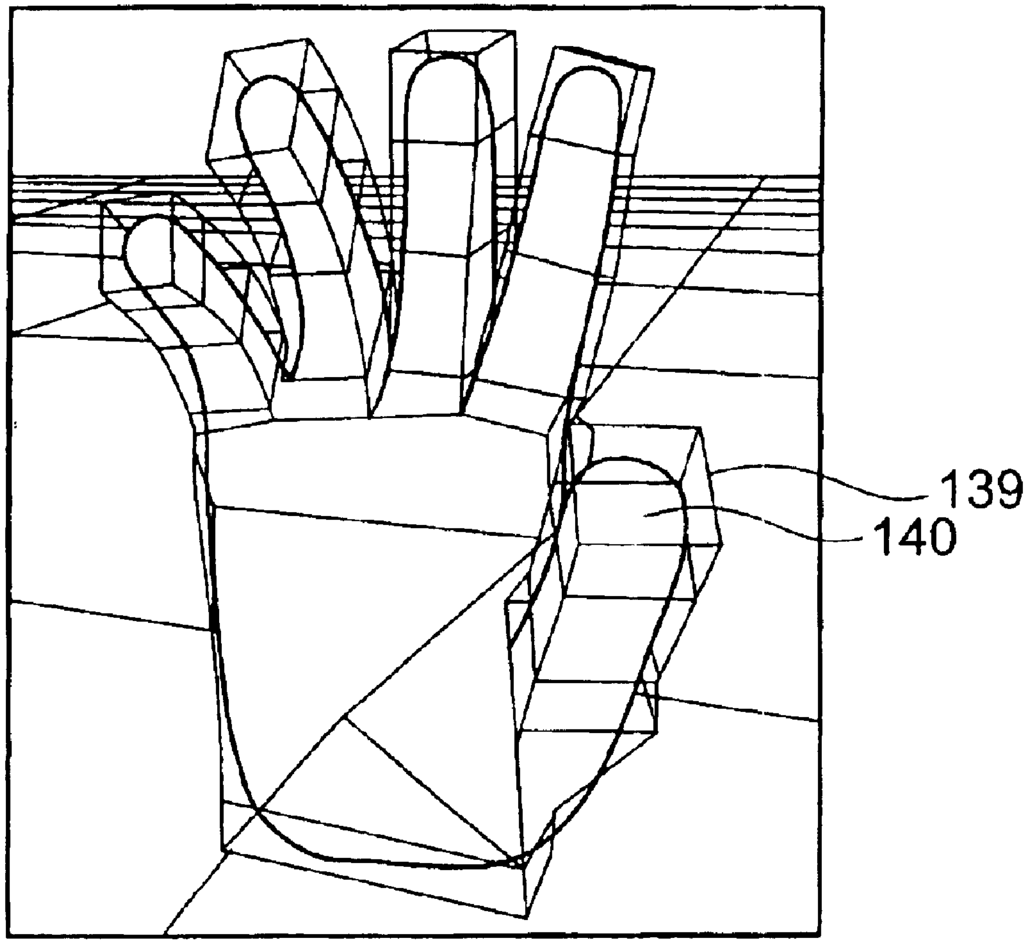
FIG. 15 is a diagram describing a three-dimensional scene attribute setting based on an XVL file of the one embodiment.

More specifically, XVL file comprises data of a control lattice called a "Lattice", which structures an outer layer 139 with such a shape as one shown in FIG. 15, and a parameter for reproducing an inner rounded shape 140, which is actually expressed with the Lattice.

Therefore, this XVL loader function section 110 extracts a parameter required for the data of this control lattice and deformation data (to generate a rounded shape) from a content of the XVL file, and generates a structured lattice scene with the control lattice. Then, the XVL loader function section 110 generates lattice shape data, which comprises a control lattice and a parameter, from contents of this lattice scene, and passes the lattice shape data to the Lattice kernel 135. The Lattice kernel 135 generates rounded shape data from the lattice shape data, which comprises a control lattice and a parameter. Then, the XVL loader function section 110 receives the rounded shape data 137 rounded by the Lattice kernel 135, generates a scene graph of the rounded shape, and passes the scene graph to the three-dimensional scene drawing function section 106.

In order to perform functions described above, as shown in FIG. 14, this XVL loader function section 110 comprises an XVL lexical analysis function section 141, an XVL syntax analysis function section 142 and an XVL conversion function section 143.

The XVL lexical analysis function section 141 receives a three-dimensional drawing command for file loading from the three-dimensional drawing command generation function section 30, obtains a content of the external XVL file 134 using a streaming reading function of JAVA, generates a token 144, and passes the token 144 to the XVL syntax analysis function section 142.

Figures 16, 17:
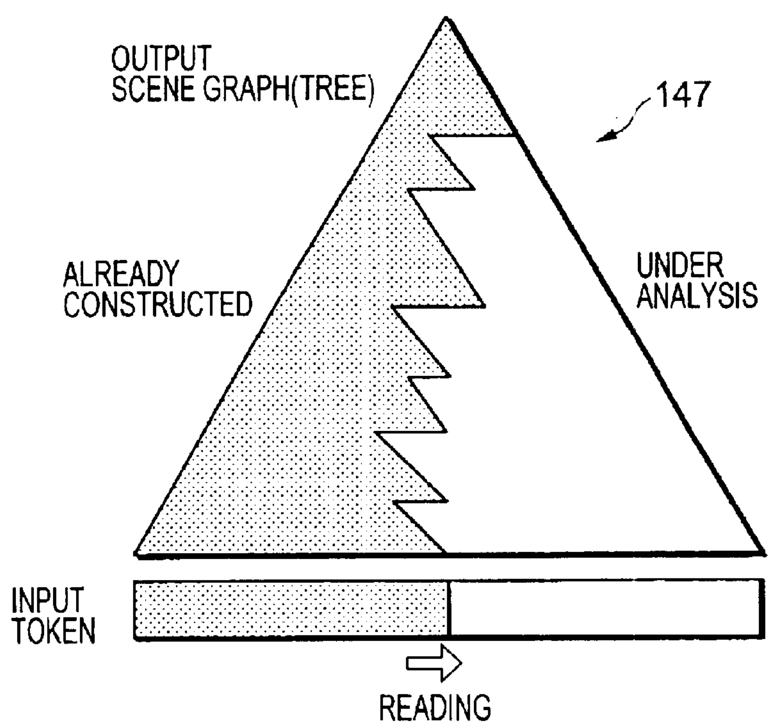
FIG. 16 is a table showing display attributes of an XVL file of the one embodiment.
FIG. 17 is a diagram describing reading processing of a scene graph of an XVL file of the one embodiment.

More specifically, since the external XVL file 134 is described in a text format, each word in a sentence in the external XVL file 134 is delimited and retrieved separately. The XVL lexical analysis function section 141 determines a meaning of each retrieved word and assigns the meaning as an attribute to the word. FIG. 16 is a table showing types and meanings of this attribute.

Each word with the attribute assigned as described above is called a token 144, and the generated token is passes to the aforesaid XVL syntax analysis function section 142.

The XVL syntax analysis function section 142 receives the token 144 from the XVL lexical analysis function section 141, analyzes a meaning and related information of a three-dimensional element from a type and an arrangement of the token 144, and constructs nodes and a tree structure of a lattice scene 145. The XVL syntax analysis function section 142 passes the constructed lattice scene 145 to the XVL conversion function section 143.

More specifically, the XVL syntax analysis function section 142 analyzes the token 144 using a recursive descending analysis technique. This technique is commonly used for a compiler in C language and the like. Using this technique and syntax stipulated in XVL, the XVL syntax analysis function section 142 constructs a tree structure of the lattice scene 145 (the scene graph) from the token 144. In processing of this technique, a scene graph 147 shown in FIG. 17 (a triangle portion in FIG. 17) is constructed from nodes in an upper left corner as reading of the tokens as inputs proceeds.

The XVL conversion function section 143 performs a conversion from a lattice shape to a rounded shape using the "Lattice kernel" 135 from data in the lattice scene 145 received from the XVL syntax analysis function section 142, generates a scene graph from the converted rounded shape data 137 and passes the scene graph to the three-dimensional scene drawing function section 106 (the scene graph construction function section).

Incidentally here, the lattice scene 145 received from the XVL syntax analysis function section 142 is called a "lattice shape", which expresses a complex shape with an extremely small amount of data. According to this XVL file, the lattice scene 145 is highly efficient since it can compress three-dimensional CAD data about one-hundred times smaller than a conventional method.

Next, the VRML loader function section 111 will be described in accordance with FIG. 18.

The VRML loader function section 111 becomes activated by a three-dimensional drawing command (the VRML file request) from the MMDSAX manager function section 22, reads an external "VRML" file 148, analyzes a content of the external VRML file 148, retrieves a described three-dimensional basic element and a relationship and a movement of the three-dimensional basic element, and generates a scene graph. The generated scene graph is passed to the three-dimensional scene drawing function section 106.

To perform the functions described above, this VRML loader function section 111 has a VRML lexical analysis function section 150 and a VRML syntax analysis function section 151.

The VRML lexical analysis function section 150 receives a three-dimensional drawing command for file loading from the three-dimensional drawing command generation function section 30, obtains a content of the external VRML file 148 using the streaming reading function of JAVA according to the three-dimensional drawing command, generates a token 152, and passes the token 152 to the VRML syntax analysis function section 151.

Figures 19, 21:
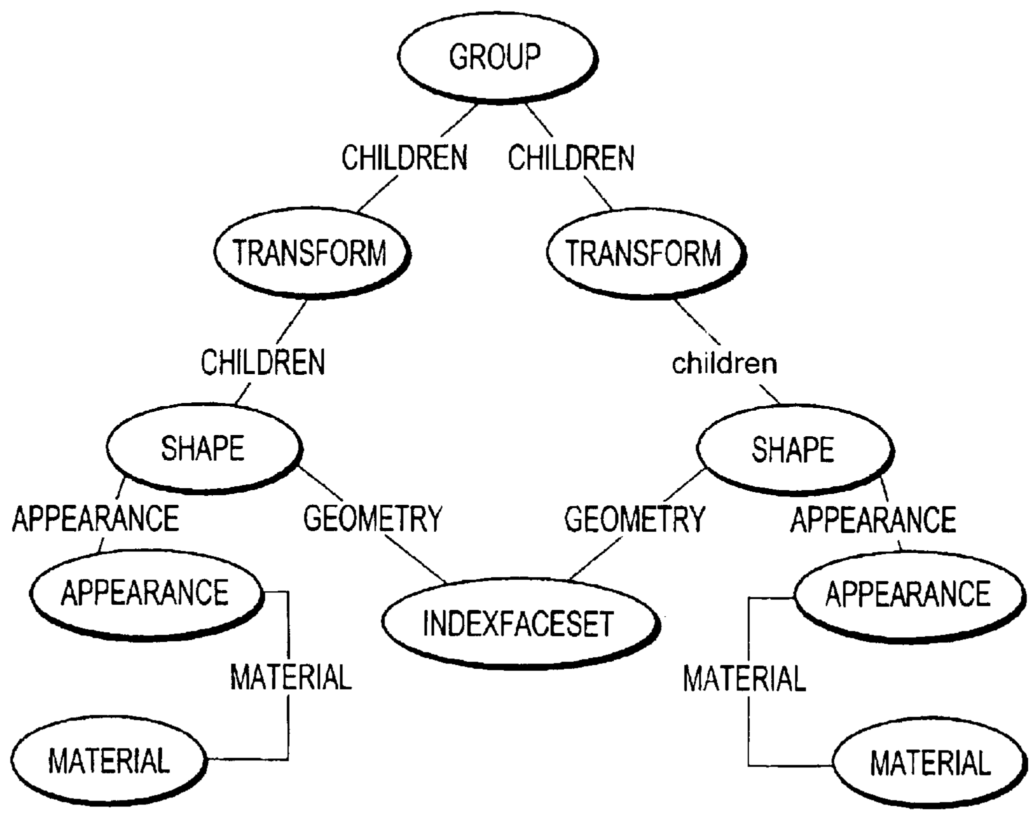
FIG. 19 is a table showing display attributes of a VRML file of the one embodiment.
FIG. 21 is a schematic view describing a scene graph tree of a three-dimensional scene of the one embodiment.

More specifically, since the external VRML file 148 is described in a text format, each word in a sentence in the external VRML file 148 is delimited and retrieved separately. The XVL lexical analysis function section 141 determines a meaning of each retrieved word and assigns the meaning as an attribute to the word. FIG. 19 is a table showing types and meanings of this attribute.

Each word with the attribute assigned as described above is called a token 152, and the generated token is passes to the VRML syntax analysis function section 151.

The VRML syntax analysis function section 151 receives a token column from the VRML lexical analysis function section, analyzes a meaning and related information of three-dimensional element from a type and an arrangement of the token column, and constructs nodes and a tree structure of a scene graph. The scene graph is passed to the scene graph construction function section in the three-dimensional scene drawing function section 106.

More specifically, the VRML syntax analysis function section 151 analyzes the token column using the recursive descending analysis technique. This technique is commonly used for a compiler in C language and the like. Using this technique and syntax stipulated in VRML 2.0, VRML syntax analysis function section 151 constructs a tree structure of the scene graph from the token 152. In processing of this technique, the scene graph tree is constructed from nodes in an upper left corner as reading of the tokens as inputs proceeds as shown in FIG. 17.

Next, the three-dimensional scene drawing function section 106, which receives a scene graph according to the three-dimensional drawing command from the aforesaid three-dimensional scene attribute setting function section 107, three-dimensional scene behavior setting function section 108, two-dimensional embedding function section 109, XVL loader function section 110 and VRML loader function section 111, will be described in accordance with FIG. 20 and subsequent figures.

The three-dimensional scene drawing function section 106 accumulates scene graphs received from each of the function sections 107–111 and retains a scene graph tree, which comprises an internal accumulation of the scene graphs. Then, in order to organize and control a rendering of node objects, which are components of the scene graph tree, the three-dimensional scene drawing function section 106 performs a conversion from the modeling coordinate system of polygons to a three-dimensional world coordinate system in the three-dimensional graphics pipeline using a consistent scan method (this method is called "traverse") from the top node, and generates scene drawing data which indicates a content of a drawing command for a three-dimensional graphics display. Then, the three-dimensional scene drawing function section 106 passes the scene drawing data to the aforesaid three-dimensional canvas function section 105.

The scene graph used in this three-dimensional scene drawing function section 106 has a scene graph structure which complies with a VRML specification. In other words, the scene graph has a similar structure to structures of some nodes in the scene graph. Nodes in the scene graph handled in this three-dimensional scene drawing function section 106 are categorized in to two types: group nodes and leaf nodes. A group node groups one child node or a plurality of child nodes. Also the group node performs an accumulation of hierarchical coordinate conversions with a transform node, which stipulates a spatial positioning for a group level and lower. Although there can be unlimited number of child nodes under a group node, there should be only one parent node. Also a leaf node does not have a child and has only one parent. A leaf node comprises a shape node, a geometry node, an appearance node, a material node, a texture node, a text node and a font style node. Also the leaf node comprises an interpolation node, a timer node, a sensor node, an anchor node, a light node and a camera node in order to assign a behavior to a scene graph.

Also in order to perform a view control for a displayed three-dimensional space, this three-dimensional scene drawing function section 106 has a function for receiving canvas information, which indicates a content of a specific event of a mouse or a keyboard, from the aforesaid three-dimensional canvas function section 105, calculating a rotation quantity of a view (Orbit), a movement quantity of the view (Pan) or a scale quantity of the view (Zoom) from a quantity of a mouse movement or a key type, updating viewpoint information, traversing the scene graph with a new viewpoint in order to reflect a change of the viewpoint information in a three-dimensional scene, and returning scene drawing data to the three-dimensional canvas function section 105.

Figure 20:
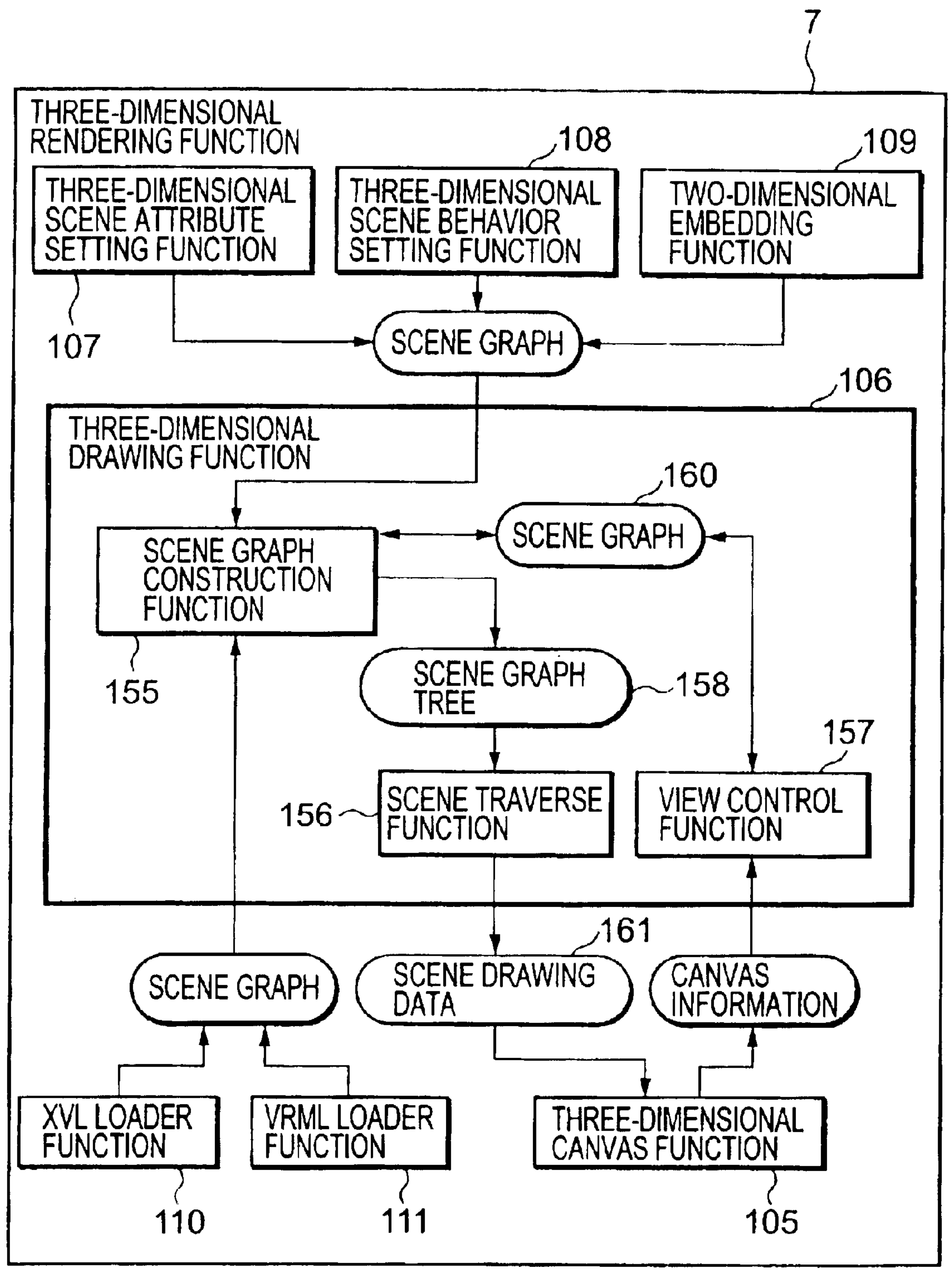
FIG. 20 is a function block diagram describing details of a three-dimensional scene drawing function section of the one embodiment.

To perform such a function, this three-dimensional scene drawing function section has a scene graph construction function section 155, a scene traverse function section 156 and a view control function section 157 as shown in FIG. 20. In the following, these components will be described further in detail.

First, the scene graph construction function section 155 provides an API capable of stipulating group nodes and leaf nodes of the scene graph used in this system, generating group nodes or leaf nodes, constructing a tree structure of scenes, and adding a scene attribute which indicate a content of a camera, a light source, a background color, a color of a shape or a texture. Thereby, the scene graph construction function section 155 receives scene graph data generated by the aforesaid material setting function section 115, texture setting function section 116, camera setting function section 117, light setting function section 118, font setting function section 119, interpolation setting function section 124, timer setting function section 125, sensor setting function section 126, image mapping function section 130 or hyperlink setting function section 131. Also this scene graph construction function section 155 receives scene graph data generated by loading (reading) the VRML file or the XVL file with the aforesaid XVL conversion function section 143, XVL syntax analysis function section 142 or VRML syntax analysis function section 151.

Then, this scene graph construction function section 155 retains a scene graph tree 158, which is an accumulation of the received scene graphs, performs an addition, a deletion or a change for the aforesaid scene graph tree 158 using scene graphs passed from each function, and passes the scene graph tree data 158 to be displayed to the scene traverse function section 156.

Also for a viewpoint control of the three-dimensional scene, this scene graph construction function section 155 passes a scene graph which indicates a content of a camera of the internally retained scene graph tree 158 to the view control function section 157, receives a scene graph 160, which indicates the content of the camera with the viewpoint changed in this view control function section 157, and changes the scene graph tree 158.

Group nodes of a scene graph stipulated in this scene graph construction function section 155 are as below:

Group node

Transform node

Leaf nodes of a scene graph stipulated in this scene graph construction function section 155 are as follows:

Shape node

IndexedFaceSet node

Text node

Appearance node

Material node

Texture node

Interpolator node

Timer node

Examples of a tree structure (a scene graph tree) of a scene graph (group nodes and leaf nodes) comprises the above nodes are shown in FIG. 21.

As shown in FIG. 21, a parent-children relationship of a scene graph is realized by an relationship of a group node of the scene graph to a children field. Here, nodes which are permitted to belong to a children field are Group nodes, Transform nodes and Shape nodes. Since scene graphs are non-cyclic graphs, these nodes which express the parent-child relationship of the scene graph tree cannot be shared. Any node except for Group nodes, Transform nodes and Shape nodes can be shared since it belongs to a non-children field of a group node.

Here, an actual three-dimensional scene is generated by positioning polygons with identical shapes and different colors on different spaces. If this three-dimensional scene is described with the scene graph tree in FIG. 21, Shape nodes cannot be shared. However, geometry (a geometry field) of an IndexedFaceSet node is shared as an identical shape. Also in order to set different colors, Appearance nodes and Material nodes are separately generated, and set to an appearance (an appearance field) in Shape.

Concomitantly, the aforesaid scene traverse function section 156 receives the scene graph tree 158 retained in the aforesaid scene graph construction function section 155 as stated previously. Then, this scene traverse function section 156 traverses (scans all nodes) from a root node of the scene graph, performs multiplication of all 4×4 matrices included in the Transform nodes to thereby generate a combined matrix, generates polygon coordinate values in the world coordinate system by multiplying the combined matrix with modeling coordinate system data (local coordinate data), which expresses a polygon of the IndexedFaceSet node, and passes the polygon coordinate values as scene drawing data 161 to the aforesaid three-dimensional canvas function section 105 (a view coordinate conversion function section).

That is, this scene traverse function section 156 is a portion of the modeling conversion 91 in a three-dimensional graphics pipeline structure shown in FIG. 9, and has a function for performing a conversion from a coordinate system defined by each node of the scene graph (the modeling coordinate system 92) to a coordinate system on the three-dimensional space (the world coordinate system 93).

In the traverse of the scene graph, a recursive scan for the Transform nodes is performed by cumulation of the 4×4 matrices in a stack, adoption of the combined matrix, completion of the traverse for a Transform node level and lower, and removal of the 4×4 matrices from the stack before proceeding to the next node.

Also this scene traverse function section 155 generates scene drawing data from a content of ray direction vectors of a light source, a viewpoint coordinate, a the line of sight direction vector, a view volume, a material parameter, a rendering mode value, the background color or a texture image retained in the scene graph tree 158 for non-polygon shape data, and passes the scene drawing data to an aftermentioned rendering mode setting function section 107 in the three-dimensional canvas function section 105.

Namely, this scene traverse function section 156 passes polygon data converted with the three-dimensional world coordinate system and rendering mode data for the three-dimensional rendering as the scene drawing data 161 to the aforesaid three-dimensional canvas function section 105.

Also the aforesaid view control function section 157 has a function for receiving canvas information 162 from a canvas event processing function section 173 in the three-dimensional canvas function section 105, described in detail later, receiving the scene graph 160, which indicates a content of a camera in the scene graph tree retained in the aforesaid scene graph construction function section 155, from a position of the mouse, an up or down event of a left mouse button or a right mouse button on screen, or a key-down event of the keyboard included in the canvas information 162, and performing a calculation for changing the viewpoint (the view) of the three-dimensional scene. Also in order to update the scene graph tree retained in the scene graph construction function section 155, the view control function section 157 passes the scene graph 160, which indicates a content of the camera with a changed viewpoint to the scene graph construction function section 155. The scene graph tree 158 with the changed viewpoint is passed to the scene traverse function section 156 in the scene graph construction function section 155, and traversed based on a new viewpoint.

Here, a viewpoint change (the view control) is a parameter setting for the view field conversion 94 in the three-dimensional graphics pipeline structure shown in FIG. 9. Specific contents of parameters for the view field conversion 94 include the viewpoint origin, the line of sight direction (Ze) and an up vector (Ye) as data for expressing the view field coordinate system shown in FIG. 23 (as a viewpoint coordinate system 178), and distance between the viewpoint and the projection plane (near clipping plane), a size of the projection plane and a far clipping plane as data for expressing a view field volume, which determines a normalized projection coordinate system shown in FIG. 23 (as a three-dimensional world coordinate system 177). The view control function section 157 changes these parameters and realizes the view control.

Specific view controls of this view control function section 157 are as follows:

Orbit

Pan

Zoom

Fit

Orbit is a view rotation centered on a point of regard and also called Examin. Pan is a view movement on a plane perpendicular to the line of sight direction. Pan maintains the line of sight direction constant. Zoom is an enlargement or a reduction of the view. Fit is an enlargement or a reduction of a view which matches a shape in the three-dimensional space to a screen size.

Also this view control function section 157 calculates an appropriate three-dimensional parameter for the view field conversion 94, which is set as each view control, using a two-dimensional movement information of the mouse on screen, the number of key-down events, and a current view field conversion parameter value. Therefore, if the mouse moves by certain number of pixels, a viewpoint movement quantity in a current large view field (Zoom out) is different from a viewpoint movement quantity in a small view field by Pan (Zoom in).

In other words, this view control function section 157 passes the camera node with the changed viewpoint in the scene graph (a tree-shaped data structure which organizes node objects for expressing a three-dimensional object; data stipulated as an API) to the scene graph construction function section 155.

Next, the aforesaid three-dimensional canvas function section 105 will be described in detail.

As shown in FIG. 8, this three-dimensional canvas function section 105 has a function for, first receiving three-dimensional drawing command data, which indicates contents of a three-dimensional scene drawing area, from the MMIDF function section 5 (MMDSAX manager function section 22), and generating the three-dimensional canvas on the Web browser 3. Also, the three-dimensional canvas function section 105 has a function for receiving the scene drawing data 161 from the aforesaid three-dimensional scene drawing function section 106 (the scene traverse function section 156), generating graphics display data 165, which comprises a two-dimensional drawing command set of Java AWT, through a mechanism of the three-dimensional graphics pipeline, and passes the graphics display data 165 to the API of Java AWT provided by the Web browser 3. in order to express an the three-dimensional scene on the three-dimensional canvas pasted on the Web browser 3.

This three-dimensional canvas function section 105 processes mechanisms in the view field conversion 94 and subsequent items shown in FIG. 9 in order to express three dimensions with the API of Java AWT, which is a command set for drawing in two dimensions.

Also as shown in FIG. 8, this three-dimensional canvas function section 105 receives an operation event 166, which indicates contents of a mouse operation or a keyboard input by the user, from the three-dimensional canvas pasted on the Web browser 3 for a viewpoint operation. In the mouse operation, the three-dimensional canvas function section 105 generates canvas information which comprises a mouse button position when the left mouse button is pressed down, when the right mouse button is pressed down, when the left mouse button is released, when the right mouse button is released or when the mouse is moved. Also in the keyboard input, the three-dimensional canvas function section 105 generates canvas information which indicates whether or not a SHIFT key, a CTRL key or a ALT key is pressed down. Then, the three-dimensional canvas function section 105 passes the generated canvas information to the three-dimensional scene drawing function section 106.

Also upon receipt of an operation event of a mouse operation by the user for a hyperlink associated with the three-dimensional scene, the three-dimensional canvas function section 105 retrieves hyperlink data 167 and passes the hyperlink data 167 to the MMIDF function section 5 (MMDSAX manager function section 22) according to contents of the operation event.

In order to perform such functions, as shown in FIG. 22, this three-dimensional canvas function section 105 has a rendering mode setting function section 170, a view coordinate conversion function section 171, a Z-buffer rendering function section 172 and the canvas event processing function section 173.

Incidentally, input data used in this three-dimensional canvas function section 105 are as below:

Three-dimensional drawing command: Data required for the three-dimensional rendering provided by this three-dimensional canvas function section 105 as a Java API. This three-dimensional canvas function section 105 receives the three-dimensional scene drawing area in this three-dimensional drawing command from the MMDSAX manager function section 22.

Scene drawing data 161: Three-dimensional data comprising the view coordinate system, and three-dimensional coordinates and normal lines of a three-dimensional polygon.

Operation event 166: Input data from the user passed to this three-dimensional canvas function section 105 from the Web browser 3. The operation event 166 comprises a mouse event or a keyboard event.

Also output data used in this three-dimensional canvas function section 105 are as follows:

Graphics display 165: Data of the API of Java AWT provided by the Web browser 3. This three-dimensional canvas function section 105 calls this API for a drawing.

Canvas information: data of a button condition of the mouse, data of a mouse coordinate on a canvas for the time of the mouse event occurrence and data of a key code for the time of the keyboard event occurrence.

Hyperlink 167: Link information data to another Web site or file. This data is passed to the MMDSAX manager function section 22 if the user selects hyperlink information embedded in the three-dimensional scene as an anchor.

Next, each of the components 170–173 of this three-dimensional canvas function section 105 will be described in detail.

The aforesaid rendering mode setting function section 170 receives the scene drawing data 161 which indicates contents of the ray direction vectors of the light source, the viewpoint coordinate, the line of sight direction vector, the view volume, the material parameter, the rendering mode value, the background color or the texture image from the aforesaid scene traverse function section 156.

In a three-dimensional rendering through the three-dimensional graphics pipeline shown in FIG. 9, in order to perform the view field conversion 94, information of the ray direction vectors of the light source, the viewpoint coordinate, the line of sight direction vector and an view field angle as well as the world coordinate system data (geometry data which forms a three-dimensional shape element). In order to perform a view volume-viewport conversion, the view volume and the material parameter as well as view coordinate system data are required. The rendering mode setting function section 170 generates scene setting data which comprises the above information and passes the scene setting data to the view coordinate conversion function section 171.

Also in order to perform a rendering with the Z-buffer method, data of the rendering mode value, the background color and the texture image as well as normalized coordinate system data of a shape are required. This rendering mode setting function section 170 generates scene setting data which comprises the above information and passes the scene setting data. to the Z-buffer rendering function section 172.

Also if a content of scene drawing data 161 received from the scene traverse function section 156 is insufficient for the view coordinate conversion function section 171 or the Z-buffer rendering function section 172, a default value for the scene setting data is adopted and passed to the view coordinate conversion function section 171 or the Z-buffer rendering function section 172.

Also the view coordinate conversion function section 171 receives scene drawing data which indicates contents of coordinate data and normal line vector data for a triangle polygon positioned in the world coordinate system, and color data of an apex of the triangle polygon from the aforesaid scene traverse function section 158. Also this view coordinate conversion function section 171 receives scene setting data 175, which comprises the ray direction vectors of the light source, the viewpoint coordinate, the line of sight direction vector, the view field angle and the view volume and the material parameter from the aforesaid rendering mode setting function section 170. From the scene drawing data 161 and the scene setting data 175 received, the view coordinate conversion function section 171 performs a coordinate conversion of data indicating a polygon from the three-dimensional world coordinate system to the normalized projection coordinate system 98 through the view field coordinate system. Also the view coordinate conversion function section 171 adjusts a color and calculates color values for the polygon from an angle created by a normal line vector of the polygon and the ray direction vectors of the light source, an angle created by the normal line vector of the polygon and the line of sight direction vector, and a color and the material parameter of the polygon itself.

Then, the view coordinate conversion function section 171 generates normalized projection scene data which comprises a converted coordinate value and calculated color values, and passes the normalized projection scene data to the Z-buffer rendering function section 172.

Figures 23, 25:
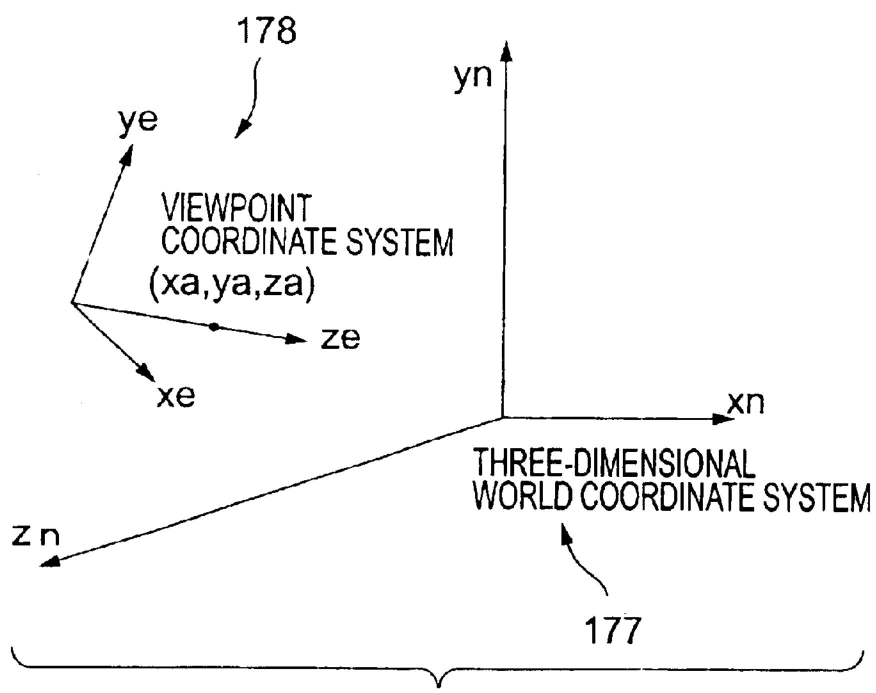
FIG. 23 is a diagram describing a relationship between a viewpoint coordinate system and a three-dimensional world coordinate system of the one embodiment.
FIG. 25 is a diagram showing other formulae required for calculating the three-dimensional scene drawing of the one embodiment.

FIG. 23 shows a relationship between the three-dimensional world coordinate system 177 and the viewpoint coordinate system 178.

The viewpoint coordinate system 178 is a left-handed coordinate system with the viewpoint as its origin, line of sight as its Z-axis and its X-axis parallel to an X-Z plane of the three-dimensional world coordinate system 177. A matrix for a conversion from this three-dimensional world coordinate system 177 to the viewpoint coordinate system 178 is obtained by combining one parallel translation matrix, two rotation matrices and one conversion matrix from a right-handed coordinate system to a left-handed coordinate system. The conversion matrix T is expressed with a formula in FIG. 24.

Here, with $(x_f, y_f, z_f)$ as a coordinate of the viewpoint and $(x_a, y_a, z_a)$ as one arbitrary point on the line of sight, sin $\alpha$, cos $\alpha$, cos $\beta$ and sin $\beta$ in the formula in FIG. 24 are expressed by formulae in FIG. 25, respectively.

Figure 27A:
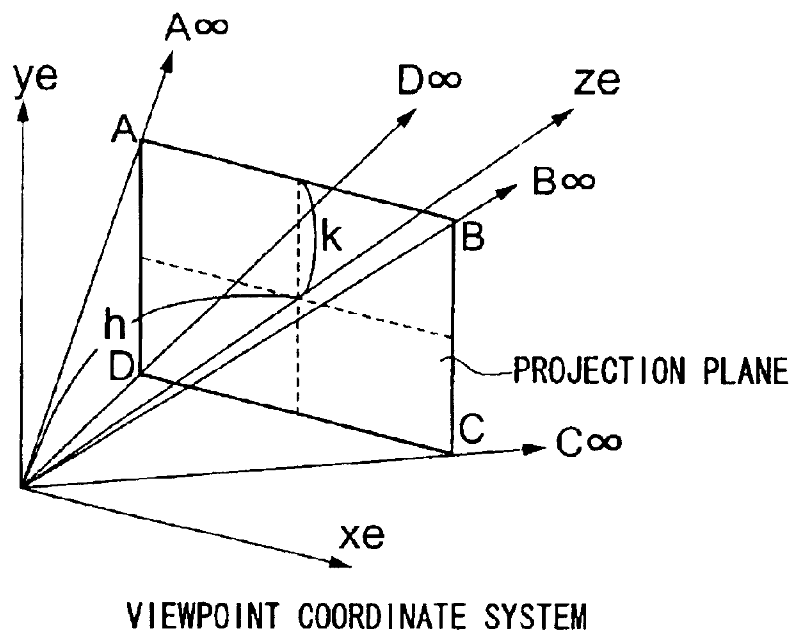
FIGS. 27A and 27B are diagrams describing a relationship between the viewpoint coordinate system and a normalized projection coordinate system of the one embodiment.
Figure 27B:
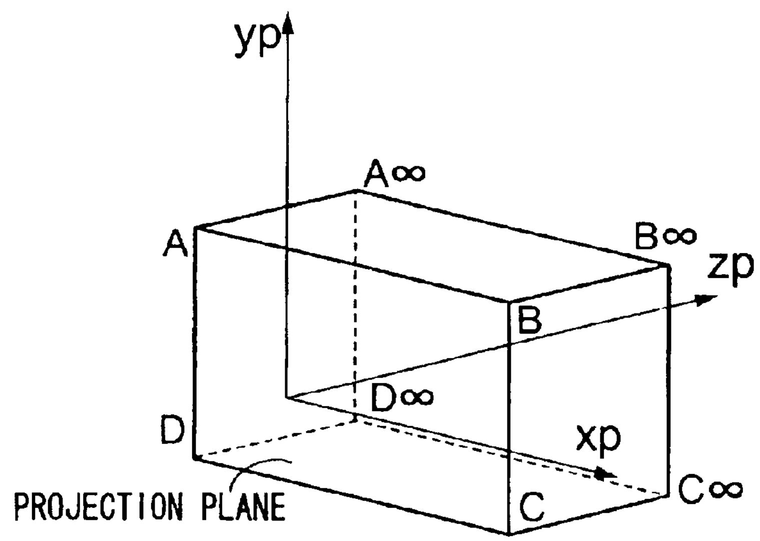

Also a relationship between the viewpoint coordinate system 178 and the normalized projection coordinate system 98 is shown in FIGS. 27A and 27B.

In FIGS. 27A and 27B, an origin of the viewpoint coordinate system on the left corresponds to an origin of the normalized projection coordinate system. A quadrangular pyramid area, which is considered to be a visible range, is placed in a rectangular parallelepiped in the normalized projection coordinate system. This conversion matrix Tpis expressed with a formula in FIG. 28.

Here, a coordinate of the projection plane is (Xe, Ye, Ze), a normalized projection coordinate is (Xp, Yp, Zp, Wp), k is half of a size of the projection plane, h is a distance between the viewpoint and the projection plane, and f is a distance to the far clipping plane.

Next, the Z-buffer rendering function section 172 (FIG. 22) will be described.

The aforesaid Z-buffer rendering function section 172 receives three-dimensional drawing command data which indicates contents of the three-dimensional scene drawing area from the three-dimensional drawing command generation function section 30 in the aforesaid MMDSAX manager function section 22. Also this Z-buffer rendering function section 172 receives the scene setting data 175 which indicates contents of the rendering mode value, the background color and the texture image from the rendering mode setting function section 170. Also the Z-buffer rendering function section 172 receives normalized projection scene data 180 which indicates contents of processed and normalized coordinate data, and the color values generated by a calculation using the normal line and the light source from the view coordinate conversion function section 171.

In order to display images eliminated by hidden surface removal in the three-dimensional scene drawing area of three-dimensional drawing command data received from the scene setting data 175 and normalized projection scene data 180, this Z-buffer rendering function section 172 internally prepares a special buffer (a depth buffer), which retains a distance between the viewpoint and a three-dimensional shape, as well as a frame buffer, which retains a pixel color of a two-dimensional tubate surface, generates graphics display data using the Z-buffer method, calls the API of Java AWT provided by the Web browser 3, and passes the graphics display data to the Web browser 3.

Procedures of the Z-buffer method employed in this Z-buffer rendering function section 172 are shown in the following:

Before one frame is drawn, the frame buffer is set for the background color as an initial value and the maximum distance is written in an entire Z-buffer.

Figures 28, 29, 30:
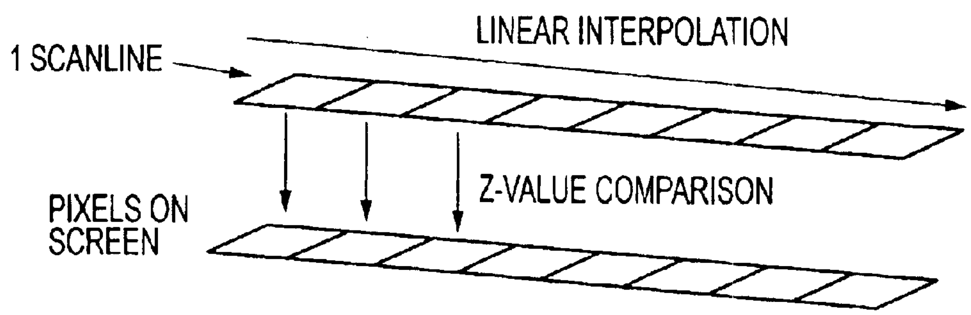
FIG. 28 is a diagram showing yet other formulae required for calculating the three-dimensional scene drawing of the one embodiment.
FIG. 29 is a conceptual diagram describing a procedure of a Z-buffer method employed in a Z-buffer rendering function section of the one embodiment.
FIG. 30 is a conceptual diagram describing another procedure of the Z-buffer method employed in the Z-buffer rendering function section of the one embodiment.

When the polygon given by the aforesaid view coordinate conversion function section 171 is written, a pixel area occupied by the polygon is calculated as shown in FIG. 29, and a linear interpolation of a polygon surface length, which contains a starting point and an ending point from left to right on a screen scanline over the pixel area, is performed.

While a value on the scanline and a value in the Z-buffer are compared pixel by pixel from the starting point to the ending point on the screen scanline, if the value on the scanline is smaller than the value in the Z-buffer, a surface (a pixel) to be drawn is assumed to be smaller than the previously drawn surface and updated. In order to perform this comparison, a length of a surface with a current pixel is linearly interpolated from the distance between the starting point and the ending point as shown in FIG. 30.

When the Z-buffer is updated, the update is performed with a color used for a matching pixel of the frame buffer.

Above comparison is performed for all pixels in the pixel area occupied by the polygon.

Next, the canvas event processing function section 173 shown in FIG. 22 will be described. This canvas event processing function section 173 waits for an event from the mouse or the keyboard, receives an operation event which indicates contents of a mouse operation or a keyboard input by the user from the Web browser 3, and passes canvas information data which indicates contents of a key type corresponding to a mouse position and the keyboard event according to a mouse button event type to the view control function section 157 in the three-dimensional scene drawing function section 106.

In this embodiment, mouse operations of the operation events received from the Web browser 3 are categorized into the following event types:

The left mouse button was pressed down.

The right mouse button was pressed down.

The left mouse button was released.

The right mouse button was released.

The mouse entered the canvas.

The mouse left the canvas.

The mouse moved.

Also in the key events are categorized into the following event types:

The SHIFT key was pressed down.

The CTRL key was pressed down.

The ATL key was pressed down.

The SHIFT key was released.

The CTRL key was released.

The ATL key was released.

Also the canvas event processing function section 173 has the following event types from combinations of the above events:

The left mouse button was held down and the mouse was dragged.

SHIFT key was held down and the mouse was dragged.

CTRL key was held down and the mouse was dragged.

ATL key was held down and the mouse was dragged.

Also this canvas event processing function section 173 waits for an operation event of the left mouse button pressed down by the user for a hyperlink associated with a three-dimensional scene, retrieves hyperlink data from contents of the operation event upon receipt of the operation event, and passes the hyperlink data to a hyperlink function section.

Steps of retrieving the hyperlink associated with the three-dimensional scene are as below:

A two-dimensional mouse coordinate on the screen coordinate system is obtained from the mouse event.

List polygons which include the obtained mouse coordinate using polygons projected on the screen coordinate system.

In the three-dimensional coordinate system, a line which connects the viewpoint origin and the mouse coordinate on the projection plane (a pick ray) is obtained.

Intersection points between each of the polygons listed above and the pick ray are calculated on the three-dimensional coordinate system, and an intersection point which is the closest to the viewpoint origin is selected.

From the polygon selected above, a three-dimensional scene object to which the mouse is pointing is identified.

A position of a two-dimensional embedded scene placed as a texture on a plane of the three-dimensional scene object identified above is obtained by converting a coordinate of the intersection point selected above in a texture mapping coordinate system.

Attainability of an assignment of the hyperlink information to the position of a two-dimensional embedded scene is determined.

According to a structure described above, all functions can be written in a descriptive language such as Java and the like in a framework of a markup language such as XML and the like, and an environment in which sound, three-dimensional images and two-dimensional images can be easily specified and played or displayed on a Web browser without requiring single-purpose viewers and players within the same space.

More specifically, a function for controlling various three-dimensional media or two-dimensional media from a tag description in XML can be realized by using an XML parser, a DOM (Document Object Model) API and SAX (Simple API for XML).

With the function described above, the following effects can be obtained especially in an engineering environment.

That is, three-dimensional visual engineering using this system can accurately provide all parties related to a product life cycle with information to share about a product.

For example, it is possible to quickly teach all related parties functional characteristics, problems related to a design or manufacturing and the like regarding the product or to issue a work request to the next process without a miscommunication.

Also it becomes easy to inform all related parties of a design concept of the product. It is very difficult for even a proficient engineer to understand the design concept from a drawing. With a conventional expression method, therefore, it is nearly impossible for a marketing planner, a designer, a production engineer, a service sales team and the like to share a common understanding and an identical image of the product and proactively and efficiently participate in a joint effort to solve problems related to the product.

In order to solve the above problem, according to the system of the present invention, if XML documents executable in this system are used for, for example, creating electronic manuals, it is possible to integrate small three-dimensional data (XVL files) with various manual documents to thereby create three-dimensional interactive manuals. More specifically, XVL-described three-dimensional objects and XML structured documents can be freely displayed, transformed or combined on Web-top according to user requirements. With various expressing methods described above, these three-dimensional interactive manuals can convey hidden information such as a product design concept and the like to all related parties.

Incidentally, the present invention is not intended to be limited to the above one embodiment and to be interpreted in a narrow sense, and various changes may be made therein without departing from the scope and spirit of the present invention.

As described above, according to the present invention, there can be provided a multimedia documents integrating and displaying system capable of using an extended function of Extended Markup Language (XML) in a language specification of an unified description, effectively combining data groups scattered across the Web, and allowing an Web content creator or an Web user to retrieve and use required information from various and large amount of information in an optimal form in order to handle a wide variety of formats for information including images, video, audio or three-dimensional graphics in a unified fashion.

Also according to the present invention, there can be provided a multimedia documents integrating and displaying system, which allows its user to easily specify sound, three-dimensional images and two-dimensional images, and build an environment which operates at a comfortable speed without requiring single-purpose viewers and players such as plug-ins and the like.

What is claimed is:

1. A multimedia documents integrating and displaying system, comprising:

a framework means for operating in close communication with a parser, interpreting various drawing tags in a document described in a markup language, generating a framework for synchronizing and operating various drawing primitives, and generating a two-dimensional drawing command and a three-dimensional drawing command based on said framework;

a two-dimensional rendering means for receiving said two-dimensional drawing command from said framework means, and creating a two-dimensional canvas capable of executing the two-dimensional drawing command on a Web browser; and a three-dimensional rendering means for receiving said three-dimensional drawing command from said framework means, and creating a three-dimensional canvas capable of executing the three-dimensional drawing command on the Web browser.

2. A system as set forth in claim 1, wherein said two-dimensional rendering means and said three-dimensional rendering means generate graphic display data for describing a two-dimensional image or a three-dimensional image using a two-dimensional drawing command set in Java AWT, and passing the graphic display data to the Web browser.

3. A system as set forth in claim 1, wherein said framework means comprises:

an execution request generation means, which is activated by the parser, for receiving call-back data corresponding to a predetermined DTD from the parser, and generating execution request description data including a description type to which a parameter is added; and a manager means for generating a two-dimensional drawing command and a three-dimensional drawing command based on said execution request description data.

4. A system as set forth in claim 3, wherein said execution request generation means comprises:

an SVG means for receiving from said parser, callback data which indicates contents of an element, an attribute name and a value based on a DTD of SVG, and generating execution request description data which indicates a two-dimensional drawing, sound, a moving image, an image, text or a hyperlink.

5. A system as set forth in claim 3, wherein said execution request generation means further comprises:

a CMW means for receiving from said parser, callback data which indicates contents of an element, an attribute name and a value based on a DTD of a CMW (Cross-Media World), and generating execution request description data which indicates a material of a three-dimensional graphic form, a texture, a camera, a light, a font, an interpolator, a timer, a sensor, image mapping, an XVL file or a VRML file.

6. A system as set forth in claim 3, wherein said execution request generation means further comprises:

a TVX means for receiving from said parser, callback data which indicates contents of an element, an attribute name and a value based on a DTD in TVX (TVML with XML), and generating execution request description data which indicates sound, a moving image, an image, a material of a three-dimensional graphic form, a texture, a camera, a light, an interpolator, a timer, a sensor or a VRML file.

7. A system as set forth in claim 3, wherein said manager means comprises the means of:

(a) structuring said execution request description data to thereby create a tree structure for an entire document described in a markup language; and (b) generating a two-dimensional drawing command or a three-dimensional drawing command according to the execution request description data in said tree structure to thereby express the document.

8. A system as set forth in claim 7, wherein said manager means further comprises the means of:

(a) mixing a two-dimensional drawing description and a three-dimensional drawing description according to a location of the execution request description data in said tree structure; and (b) generating a two-dimensional embedding command for embedding a two-dimensional canvas provided by said two-dimensional rendering means in a three-dimensional canvas provided by said three-dimensional rendering means.

9. A system as set forth in claim 3, wherein said manager means further comprises the step of:

converting an operation event received through the Web browser to a two-dimensional drawing command or a three-dimensional drawing command.

10. A system as set forth in claim 1, wherein said framework means, the two-dimensional rendering means and the three-dimensional rendering means comprise the means of:

(a) being activated by the Web browser; and (b) being executed after being read as objects.

11. A system as set forth in claim 1, wherein said two-dimensional rendering means comprises:

a means for receiving a two-dimensional drawing command from said manager means, and generating a drawing method call according to a content of the two-dimensional drawing command;

a two-dimensional drawing means for receiving said drawing method call, and converting the drawing method call to media operation data; and a two-dimensional canvas means for receiving the media operation data from the two-dimensional drawing means, generating a two-dimensional canvas on the Web browser, and executing a graphic display according to the media operation data.

12. A system as set forth in claim 11, wherein said two-dimensional canvas means comprises:

a two-dimensional object managing means for generating a rendering request after receiving the media operation data and transferring a two-dimensional file to be used by said two-dimensional drawing means, and requesting image data generation for an entire two-dimensional canvas based on the media operation data and the two-dimensional file; and a two-dimensional object display means for receiving the rendering request from said two-dimensional object managing means, and setting a two-dimensional display attribute in a two-dimensional canvas according to the rendering request.

13. A system as set forth in claim 12, wherein said two-dimensional canvas means further comprises:

a two-dimensional media operation means for receiving an operation event for a two-dimensional operation from the Web browser, and passing a rendering request to said two-dimensional object display means according to the operation event.

14. A system as set forth in claim 13, wherein said two-dimensional object display means comprises the means of:

(a) passing a partial rendering request to said two-dimensional drawing means according to the rendering request received from said two-dimensional media operation means; and (b) receiving the media operation data from the two-dimensional drawing means.

15. A system as set forth in claim 11, wherein said two-dimensional canvas means further comprises:

a means for calculating transformation data for a two-dimensional canvas if the two-dimensional canvas is pasted to a three-dimensional canvas, and setting a two-dimensional display attribute on a transformed two-dimensional canvas according to the transformation data.

16. A system as set forth in claim 1, wherein said three-dimensional rendering means comprises:

a three-dimensional scene graph generation means for reading three-dimensional data based on three-dimensional drawing commands received from said manager means, and generating three-dimensional scene graphs for three-dimensional displays according to the three-dimensional drawing commands;

a three-dimensional scene drawing means for retaining a scene graph tree, which is an accumulation of the above three-dimensional scene graphs, and generating scene drawing data by traversing the scene graph tree; and a three-dimensional canvas means for generating a three-dimensional canvas on a predetermined drawing area on the Web browser, and concomitantly generating graphic display data to be displayed on said three-dimensional canvas based on three-dimensional scene drawing data from said three-dimensional scene drawing means.

17. A system as set forth in claim 16, wherein said three-dimensional scene graph generation means comprises:

a means, which is activated by a three-dimensional drawing command from said manager means, for setting or changing three-dimensional attributes including material, texture, camera, light and font style in the scene graph, and generating a scene graph with a three-dimensional attribute setting to thereby reflect a change in the three-dimensional attributes in a three-dimensional space.

18. A system as set forth in claim 16, wherein said three-dimensional scene graph generation means further comprises:

a means, which is activated by a three-dimensional drawing command from said manager means, for setting or changing a behavior of a scene graph, expressing a moving image animation from part of a scene or an entire scene according to a time, an event and/or the like, and generating a scene graph from a three-dimensional behavior setting to thereby reflect a change of the three-dimensional behavior in the three-dimensional space.

19. A system as set forth in claim 18, wherein the three-dimensional drawing command from said manager means comprises:

information on a sensor, a timer and an interpolation for defining a behavior of a three-dimensional animation.

20. A system as set forth in claim 16, wherein said three-dimensional scene graph generation means further comprises:

a two-dimensional embedding means for receiving a three-dimensional drawing command from said manager means for embedding two-dimensional image data, and generating a scene graph in which the two-dimensional image data becomes embedded.

21. A system as set forth in claim 20, wherein said two-dimensional embedding means comprises the means of:

(a) receiving from said manager means a three-dimensional drawing command which includes an image mapping setting for mapping an image to a three-dimensional image; and (b) generating a scene graph for setting a texture for image mapping in the scene graph tree retained by said three-dimensional scene drawing means.

22. A system as set forth in claim 20, wherein said two-dimensional embedding means comprises:

a hyperlink setting means for receiving hyperlink data as well as two-dimensional image data as a three-dimensional drawing command if a hyperlink is set in a two-dimensional image to be embedded, and generating a scene graph for embedding two-dimensional data which includes hyperlink information therein.

23. A system as set forth in claim 16, wherein said three-dimensional scene graph generation means further comprises:

an XVL loader means, which is activated by a three-dimensional drawing command from said manger means, for reading an external XVL file, retrieving a lattice-shaped three-dimensional element using a Lattice kernel, converting the lattice-shaped three-dimensional element into a rounded three-dimensional element, and generating a scene graph.

24. A system as set forth in claim 16, wherein said three-dimensional scene graph generation means further comprises:

a VRML loader means, which is activated by a three-dimensional drawing command from said manager means, for reading an external VRML file, analyzing a content of the external VRML file, retrieving a three-dimensional basic element, and a relationship and a movement of the three-dimensional basic element, and generating a scene graph.

25. A system as set forth in claim 16, wherein said three-dimensional scene drawing means comprises:

a three-dimensional scene graph construction means for receiving a plurality of scene graphs according to a content of a three-dimensional drawing command from said scene graph generation means, generating a scene graph tree of scenes to be displayed using structured group nodes and reel nodes based on the scene graphs, and concomitantly performing an addition, a deletion or a change for the scene graphs in said scene graph tree; and a means for receiving said scene graph tree from said three-dimensional scene graph construction means, scanning (traversing) all nodes in this scene graph tree from its root node, converting a coordinate system of polygon shape data (a modeling coordinate system), defined in each node, to a three-dimensional coordinate system in a three-dimensional space (a world coordinate system), and thereby generating scene drawing data.

26. A system as set forth in claim 25, wherein said scene drawing data comprises:

rendering mode data generated from non-polygon shape data retained in the scene graph tree.

27. A system as set forth in claim 25, wherein there is comprised:

a view control means for receiving a scene graph indicating a content of a camera in the scene graph tree, converting a coordinate to change a viewpoint in a three-dimensional scene, and passing the scene graph with a changed viewpoint to said scene drawing means.

28. A system as set forth in claim 16, wherein said three-dimensional canvas means comprises:

a view coordinate conversion means for receiving scene drawing data including the polygon shape data from said three-dimensional scene drawing means, and normalizing coordinates of the polygon shape data to draw the polygon shape data in two dimensions on said three-dimensional canvas; and a means for receiving normalized projection scene drawing data from said view coordinate conversion means, and generating graphic display data while buffering image drawing data to display images eliminated by hidden surface removal in said three-dimensional canvas.

29. A system as set forth in claim 28, wherein said three-dimensional canvas means further comprises:

a means for receiving scene drawing data excluding the polygon shape data from said three-dimensional scene drawing means, and generating a rendering mode according to the scene drawing data.

30. A system as set forth in claim 28, wherein said three-dimensional canvas means further comprises:

a means for generating three-dimensional canvas information based on an operation event from the Web browser for the three-dimensional canvas, and passing the three-dimensional canvas information to said scene drawing means.

31. A computer program product for integrating and displaying multimedia documents using a computer computer program product, comprising:

a framework means for operating in close communication with a parser, interpreting various drawing tags in a document described in a markup language, generating a framework for synchronizing and operating various drawing primitives, and generating a two-dimensional drawing command and a three-dimensional drawing command based on said framework;

a two-dimensional rendering means for receiving said two-dimensional drawing command from said framework means, and creating a two-dimensional canvas capable of executing the two-dimensional drawing command on a Web browser; and a three-dimensional rendering means for receiving said three-dimensional drawing command from said framework means, and creating a three-dimensional canvas capable of executing the three-dimensional drawing command on the Web browser.

32. A computer program product as set forth in claim 31, wherein said two-dimensional rendering means and said three-dimensional rendering means generate graphic display data for describing a two-dimensional image or a three-dimensional image using a command set in Java AWT, and passing the graphic display data to the Web browser.

33. A computer program product as set forth in claim 31, wherein said framework means comprises:

an execution request generation means, which is activated by the parser, for receiving call-back data corresponding to a predetermined DTD from the parser, and generating execution request description data including a description type to which a parameter is added; and a manager means for generating a two-dimensional drawing command and a three-dimensional drawing command based on said execution request description data.

34. A computer program product as set forth in claim 33, wherein said execution request generation means comprises:

an SVG means for receiving from said parser, callback data which indicates contents of an element, an attribute name and a value based on a DTD of SVG, and generating execution request description data which indicates a two-dimensional drawing, sound, a moving image, an image, text or a hyperlink.

35. A computer program product as set forth in claim 33, wherein said execution request generation means further comprises:

a CMW means for receiving from said parser, callback data which indicates contents of an element, an attribute name and a value based on a DTD of a CMW (Cross-Media World), and generating execution request description data which indicates a material of a three-dimensional graphic form, a texture, a camera, a light, a font, an interpolator, a timer, a sensor, image mapping, an XVL file or a VRML file.

36. A computer program product as set forth in claim 33, wherein said execution request generation means further comprises:

a TVX means for receiving from said parser, callback data which indicates contents of an element, an attribute name and a value based on a DTD in TVX (TVML with XML), and generating execution request description data which indicates sound, a moving image, an image, a material of a three-dimensional graphic form, a texture, a camera, a light, an interpolator, a timer, a sensor or a VRML file.

37. A computer program product as set forth in claim 33, wherein said manager means comprises the means of:

(a) structuring said execution request description data to thereby create a tree structure for an entire document described in a markup language; and (b) generating a two-dimensional drawing command or a three-dimensional drawing command according to the execution request description data in said tree structure to thereby express the document.

38. A computer program product as set forth in claim 37, wherein said manager means further comprises the means of:

(a) mixing a two-dimensional drawing description and a three-dimensional drawing description according to a location of the execution request description data in said tree structure; and (b) generating a two-dimensional embedding command for embedding a two-dimensional canvas provided by said two-dimensional rendering means in a three-dimensional canvas provided by said three-dimensional rendering means.

39. A computer program product as set forth in claim 33, wherein said manager means further comprises the step of:

converting an operation event received through the Web browser to a two-dimensional drawing command or a three-dimensional drawing command.

40. A computer program product as set forth in claim 31, wherein said framework means, the two-dimensional rendering means and the three-dimensional rendering means comprise the means of:

(a) being activated by the Web browser; and (b) being executed after being read as objects.

41. A computer program product as set forth in claim 31, wherein said two-dimensional rendering means comprises:

a means for receiving a two-dimensional drawing command from said manager means, and generating a drawing method call according to a content of the two-dimensional drawing command;

a two-dimensional drawing means for receiving said drawing method call, and converting the drawing method call to media operation data; and a two-dimensional canvas means for receiving the media operation data from the two-dimensional drawing means, generating a two-dimensional canvas on the Web browser, and executing a graphic display according to the media operation data.

42. A computer program product as set forth in claim 41, wherein said two-dimensional canvas means comprises:

a two-dimensional object managing means for generating a rendering request after receiving the media operation data and transferring a two-dimensional file to be used by said two-dimensional drawing means, and requesting image data generation for an entire two-dimensional canvas based on the media operation data and the two-dimensional file; and a two-dimensional object display means for receiving the rendering request from said two-dimensional object managing means, and setting a two-dimensional display attribute in a two-dimensional canvas according to the rendering request.

43. A computer program product as set forth in claim 42, wherein said two-dimensional canvas means further comprises:

a two-dimensional media operation means for receiving an operation event for a two-dimensional operation from the Web browser, and passing a rendering request to said two-dimensional object display means according to the operation event.

44. A computer program product as set forth in claim 43, wherein said two-dimensional object display means comprises the means of:

(a) passing a partial rendering request to said two-dimensional drawing means according to the rendering request received from said two-dimensional media operation means; and (b) receiving the media operation data from the two-dimensional drawing means.

45. A computer program product as set forth in claim 41, wherein said two-dimensional canvas means further comprises:

a means for calculating transformation data for a two-dimensional canvas if the two-dimensional canvas is pasted to a three-dimensional canvas, and setting a two-dimensional display attribute on a transformed two-dimensional canvas according to the transformation data.

46. A computer program product as set forth in claim 31, wherein said three-dimensional rendering means comprises:

a three-dimensional scene graph generation means for reading three-dimensional data based on three-dimensional drawing commands received from said manager means, and generating three-dimensional scene graphs for three-dimensional displays according to the three-dimensional drawing commands;

a three-dimensional scene drawing means for retaining a scene graph tree, which is an accumulation of the above three-dimensional scene graphs, and generating scene drawing data by traversing the scene graph tree; and a three-dimensional canvas means for generating a three-dimensional canvas on a predetermined drawing area on the Web browser, and concomitantly generating graphic display data to be displayed on said three-dimensional canvas based on three-dimensional scene drawing data from said three-dimensional scene drawing means.

47. A computer program product as set forth in claim 46, wherein said three-dimensional scene graph generation means comprises:

a means, which is activated by a three-dimensional drawing command from said manager means, for setting or changing three-dimensional attributes including material, texture, camera, light and font style in the scene graph, and generating a scene graph with a three-dimensional attribute setting to thereby reflect a change in the three-dimensional attributes in a three-dimensional space.

48. A computer program product as set forth in claim 46, wherein said three-dimensional scene graph generation means further comprises:

a means, which is activated by a three-dimensional drawing command from said manager means, for setting or changing a behavior of a scene graph, expressing a moving image animation from part of a scene or an entire scene according to a time, an event and/or the like, and generating a scene graph from a three-dimensional behavior setting to thereby reflect a change of the three-dimensional behavior in the three-dimensional space.

49. A computer program product as set forth in claim 48, wherein the three-dimensional drawing command from said manager means comprises:

information on a sensor, a timer and an interpolation for defining a behavior of a three-dimensional animation.

50. A computer program product as set forth in claim 46, wherein said three-dimensional scene graph generation means further comprises:

a two-dimensional embedding means for receiving a three-dimensional drawing command from said manager means for embedding two-dimensional image data, and generating a scene graph in which the two-dimensional image data becomes embedded.

51. A computer program product as set forth in claim 50, wherein said two-dimensional embedding means comprises the means of:

(a) receiving from said manager means a three-dimensional drawing command which includes an image mapping setting for mapping an image to a three-dimensional image; and (b) generating a scene graph for setting a texture for image mapping in the scene graph tree retained by said three-dimensional scene drawing means.

52. A computer program product as set forth in claim 50, wherein said two-dimensional embedding means comprises:

a hyperlink setting means for receiving hyperlink data as well as two-dimensional image data as a three-dimensional drawing command if a hyperlink is set in a two-dimensional image to be embedded, and generating a scene graph for embedding two-dimensional data which includes hyperlink information therein.

53. A computer program product as set forth in claim 46, wherein said three-dimensional scene graph generation means further comprises:

an XVL loader means, which is activated by a three-dimensional drawing command from said manger means, for reading an external XVL file, retrieving a lattice-shaped three-dimensional element using a Lattice kernel, converting the lattice-shaped three-dimensional element into a rounded three-dimensional element, and generating a scene graph.

54. A computer program product as set forth in claim 46, wherein said three-dimensional scene graph generation means further comprises:

a VRML loader means, which is activated by a three-dimensional drawing command from said manager means, for reading an external VRML file, analyzing a content of the external VRML file, retrieving a thee-dimensional basic element, and a relationship and a movement of the three-dimensional basic element, and generating a scene graph.

55. A computer program product as set forth in claim 46, wherein said three-dimensional scene drawing means comprises:

a three-dimensional scene graph construction means for receiving a plurality of scene graphs according to a content of a three-dimensional drawing command from said scene graph generation means, generating a scene graph tree of scenes to be displayed using structured group nodes and reel nodes based on the scene graphs, and concomitantly performing an addition, a deletion or a change for the scene graphs in said scene graph tree; and a means for receiving said scene graph tree from said three-dimensional scene graph construction means, scanning (traversing) all nodes in this scene graph tree from its root node, converting a coordinate system of polygon shape data (a modeling coordinate system), defined in each node, to a three-dimensional coordinate system in a three-dimensional space (a world coordinate system), and thereby generating scene drawing data.

56. A computer program product as set forth in claim 55, wherein said scene drawing data comprises:

rendering mode data generated from non-polygon shape data retained in the scene graph tree.

57. A computer program product as set forth in claim 55, wherein there is comprised:

a view control means for receiving a scene graph indicating a content of a camera in the scene graph tree, converting a coordinate to change a viewpoint in a three-dimensional scene, and passing the scene graph with a changed viewpoint to said scene drawing means.

58. A computer program product as set forth in claim 46, wherein said three-dimensional canvas means comprises:

a view coordinate conversion means for receiving scene drawing data including the polygon shape data from said three-dimensional scene drawing means, and normalizing coordinates of the polygon shape data to draw the polygon shape data in two dimensions on said three-dimensional canvas; and a means for receiving normalized projection scene drawing data from said view coordinate conversion means, and generating graphic display data while buffering image drawing data to display images eliminated by hidden surface removal in said three-dimensional canvas.

59. A computer program product as set forth in claim 58, wherein said three-dimensional canvas means further comprises:

a means for receiving scene drawing data excluding the polygon shape data from said three-dimensional scene drawing means, and generating a rendering mode according to the scene drawing data.

60. A computer program product as set forth in claim 58, wherein said three-dimensional canvas means further comprises:

a means for generating three-dimensional canvas information based on an operation event from the Web browser for the three-dimensional canvas, and passing the three-dimensional canvas information to said scene drawing means.

* * * * *